United States Patent
Kawabata et al.

(10) Patent No.: US 6,850,350 B2
(45) Date of Patent: Feb. 1, 2005

(54) OPTICAL SCANNER

(75) Inventors: Motonobu Kawabata, Kyoto (JP); Masahiko Kokubo, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 30 days.

(21) Appl. No.: 10/600,869

(22) Filed: Jun. 23, 2003

(65) Prior Publication Data

US 2004/0004747 A1 Jan. 8, 2004

(30) Foreign Application Priority Data

Jun. 26, 2002 (JP) .................................... P2002-186158

(51) Int. Cl.⁷ ............................................. G02B 26/08
(52) U.S. Cl. ..................................................... 359/205
(58) Field of Search .............................. 359/205–207, 359/662, 687, 689

(56) References Cited

U.S. PATENT DOCUMENTS 5,493,446 A * 2/1996 Nakajima ................... 359/650

FOREIGN PATENT DOCUMENTS

| EP | 0 412 037 | 2/1991 |
| EP | 0 506 338 | 9/1992 |
| JP | 03-249722 | 11/1991 |
| JP | 07120670 | 5/1995 |
| JP | 08029714 | 2/1996 |
| JP | P3024906 | 1/2000 |

* cited by examiner

Primary Examiner—Euncha P. Cherry
(74) Attorney, Agent, or Firm—McDermott Will & Emery LLP

(57) ABSTRACT

An optical scanner according to the present invention comprises a collimator lens, a cylindrical lens, a light deflector, an f-θ lens and an anamorphic lens. The f-θ lens is constituted by three groups of five lenses, i.e., a first cemented lens formed by bonding a first lens and a second lens to each other, a second cemented lens formed by boding a third lens and a fourth lens to each other and a fifth lens having positive refracting power. The f-θ lens is formed to satisfy relational expressions L/f<0.100 and 0.04≦r1/r4≦0.31, where L represents the total length of the f-θ lens, f represents the focal distance of the f-θ lens, r1 represents the radius of curvature of an entrance-side refracting interface of the first lens and r4 represents the radius of curvature of an entrance-side refracting interface of the third lens. Thus, a compact optical scanner comprising an f-θ lens having a small total length L and high optical performance is provided also when increasing a focal length f as well as a scanning line length W.

18 Claims, 30 Drawing Sheets

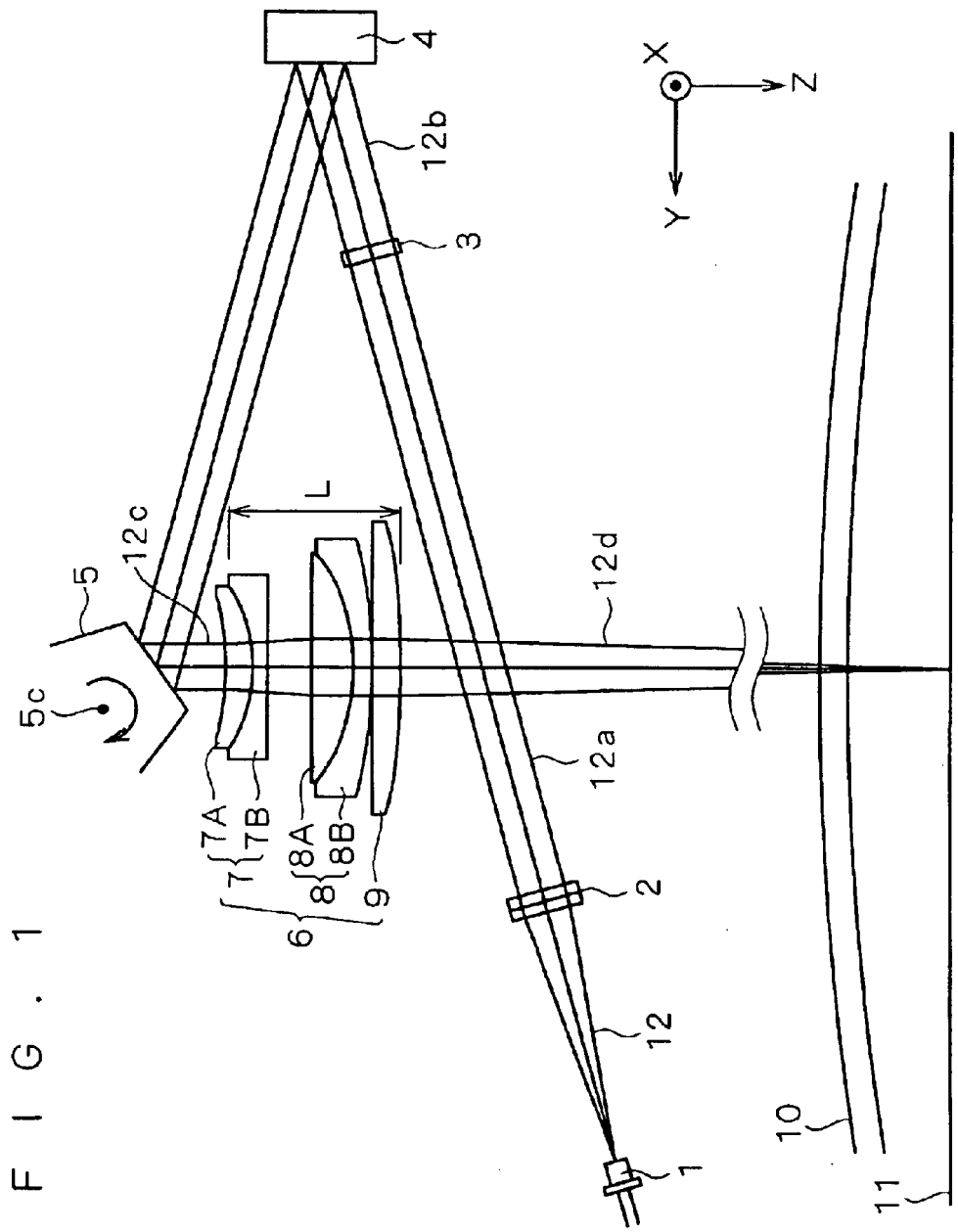

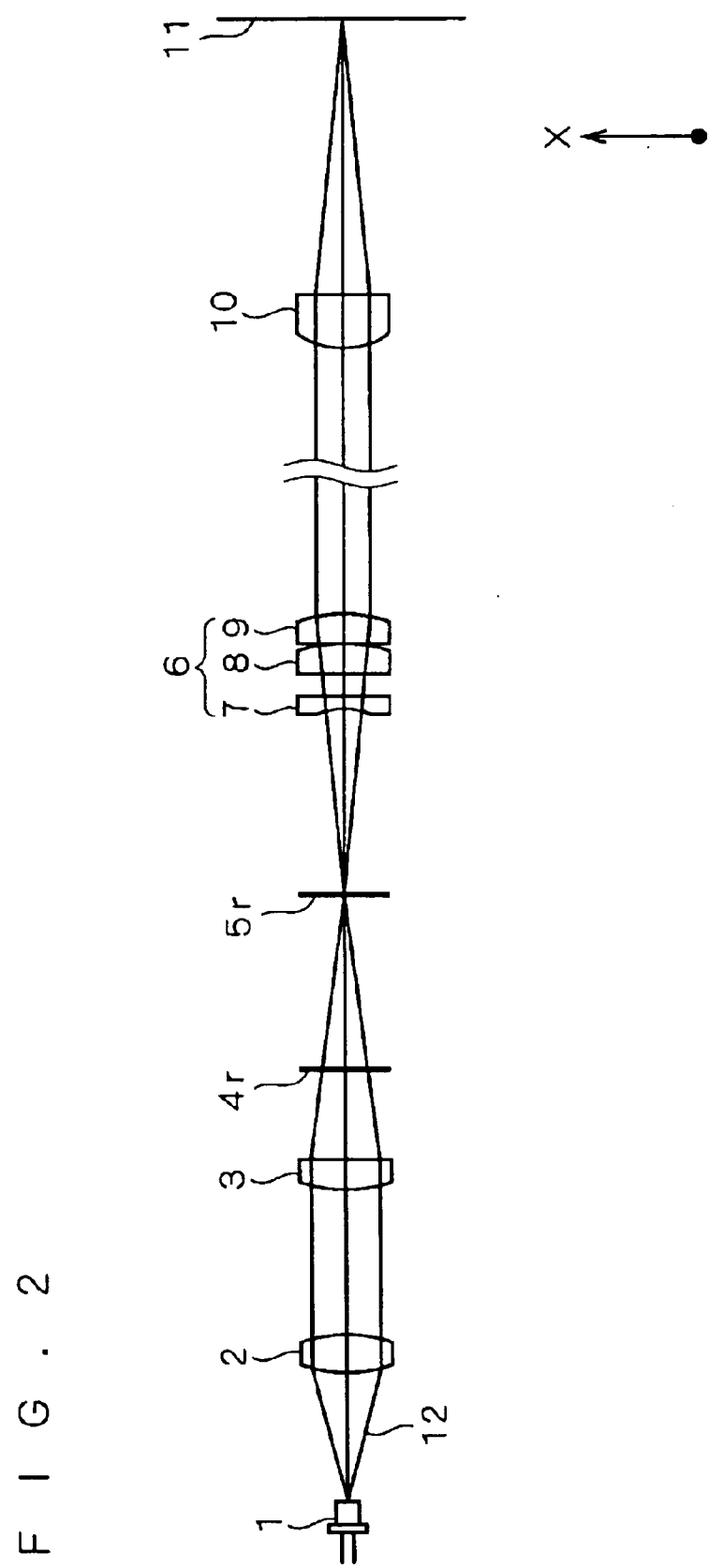

F I G. 6
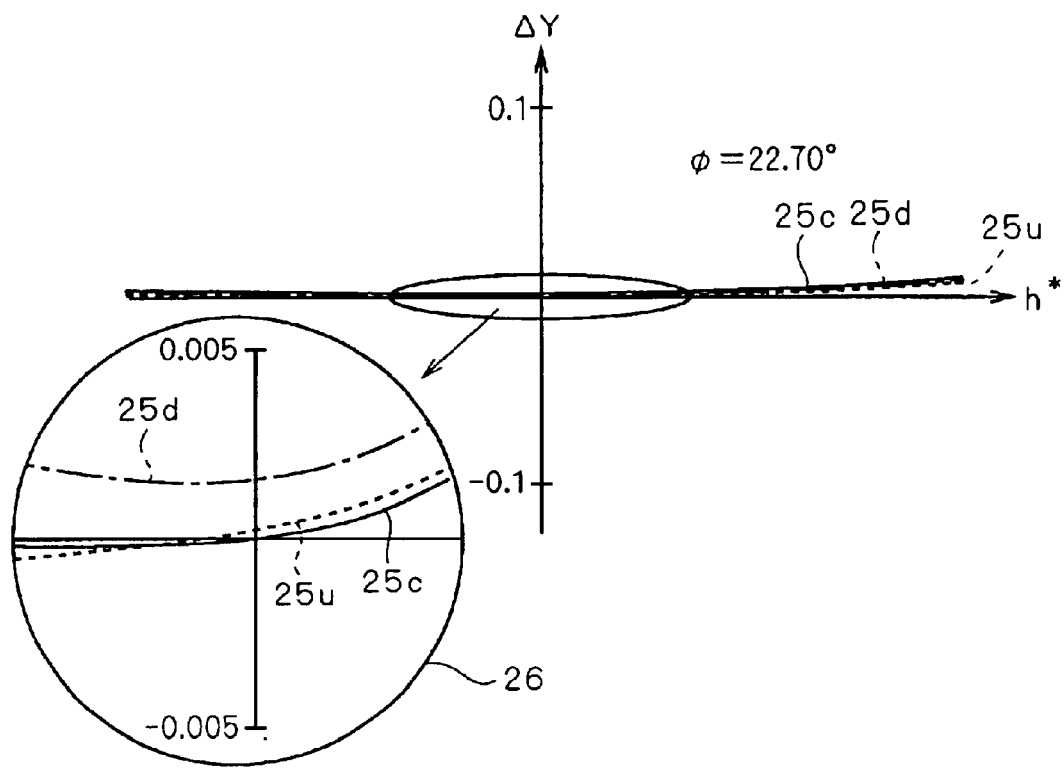
F I G. 7
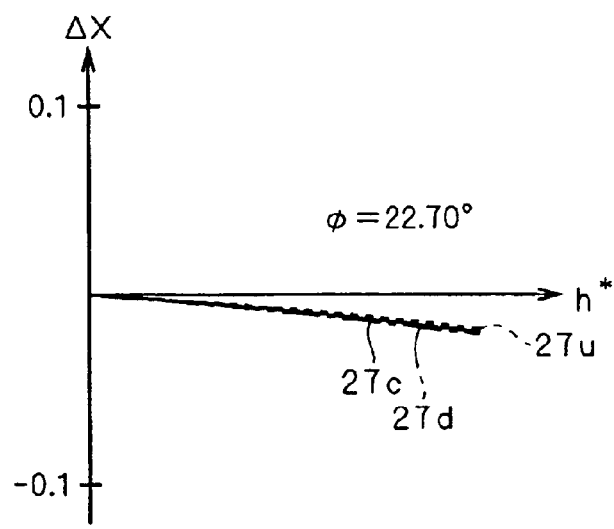

F I G . 8
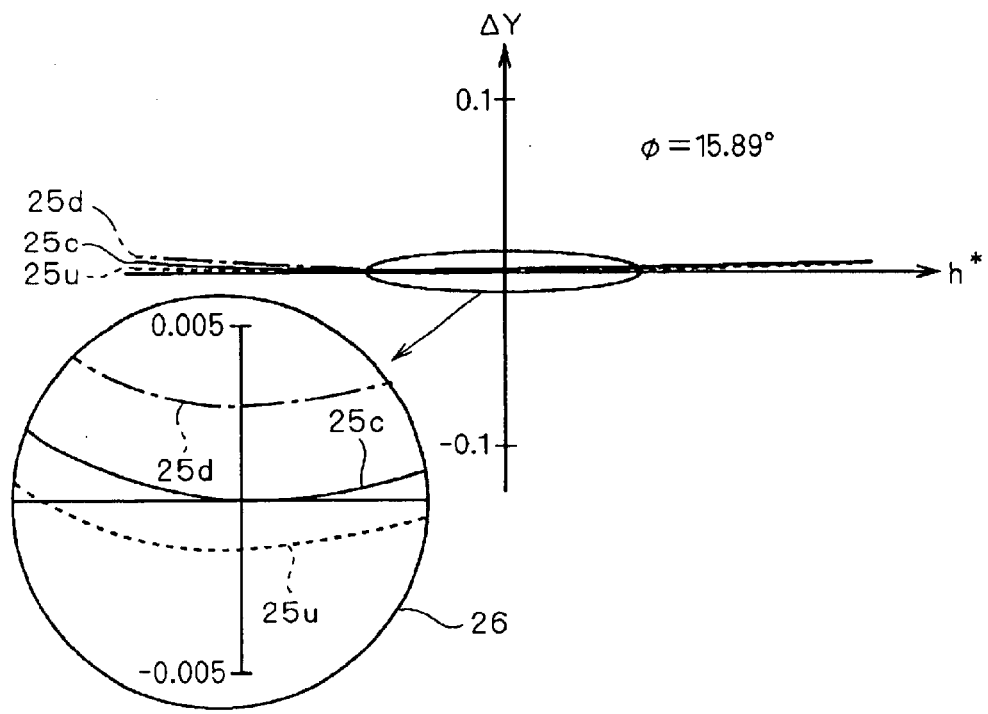
F I G . 9
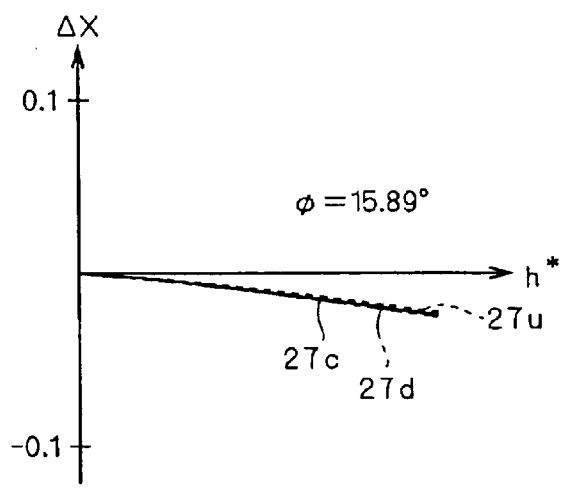

F I G . 1 3
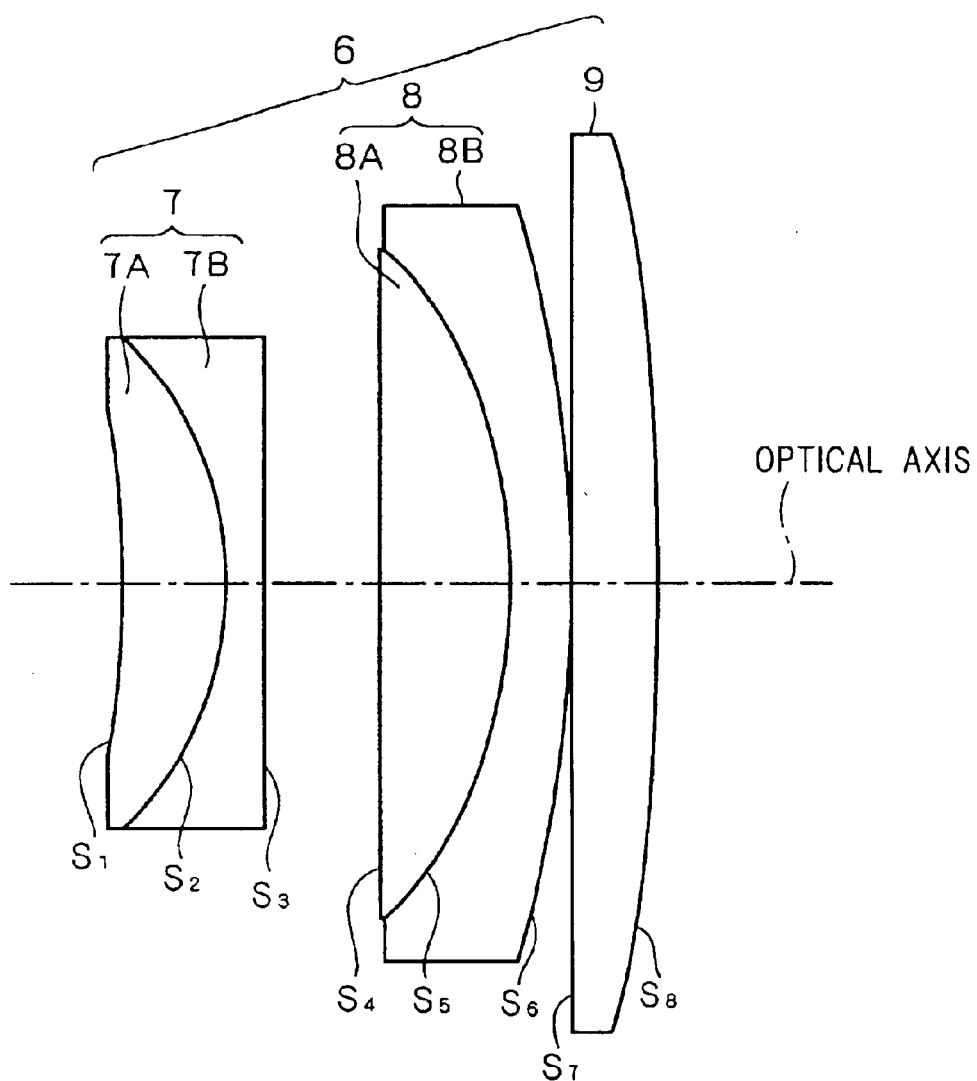

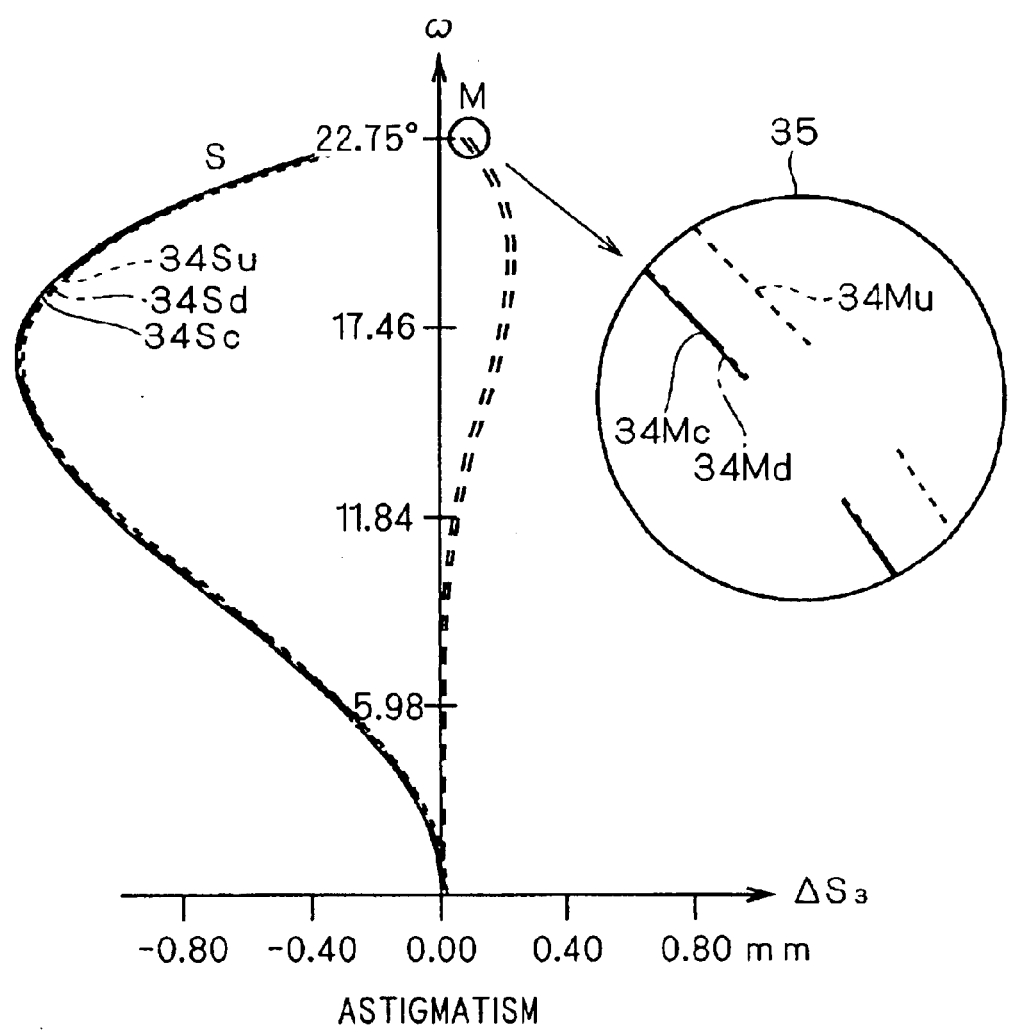
F I G . 1 5

F I G . 2 2
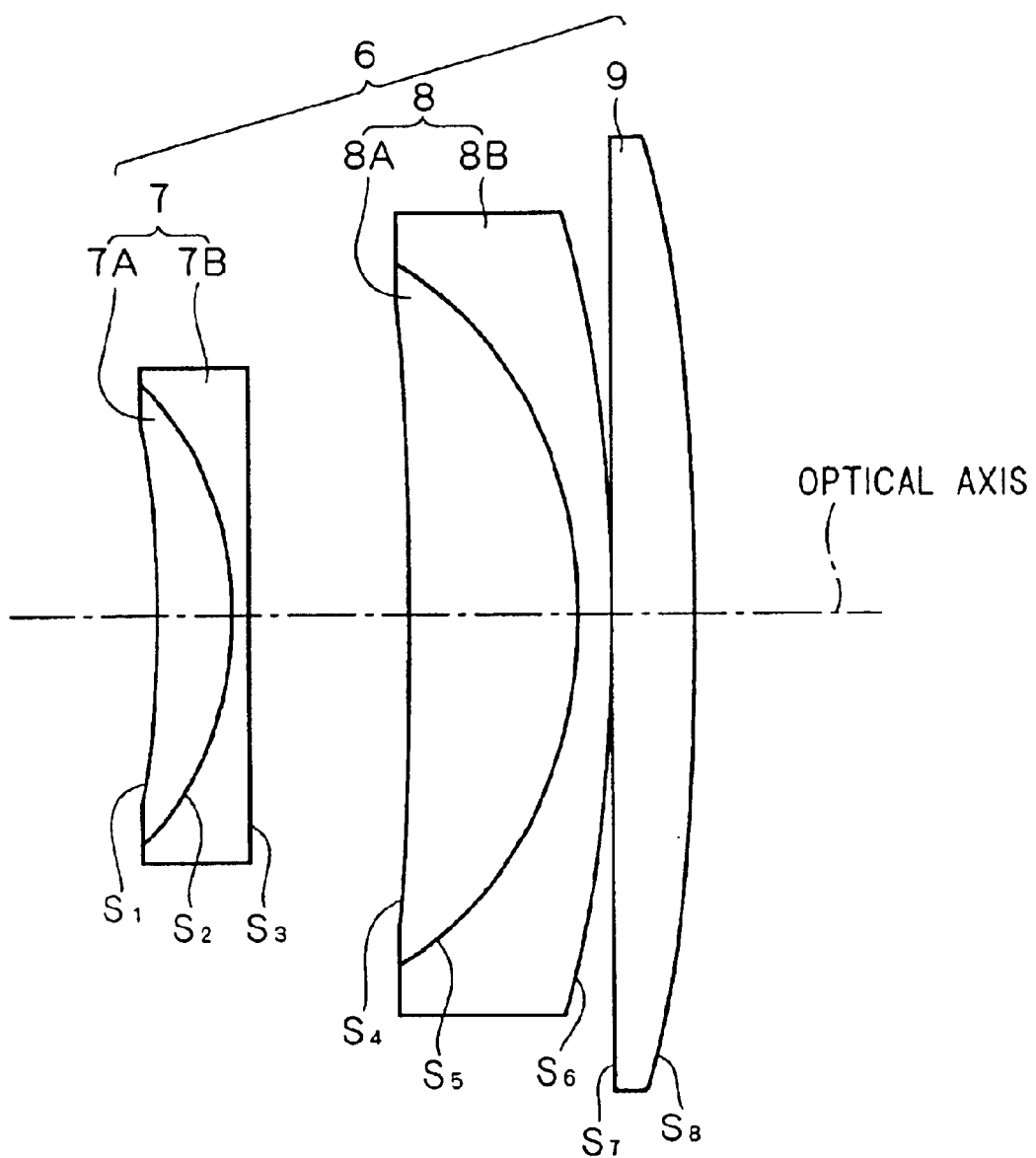

OPTICAL SCANNER

BACKGROUND OF THE INVENTION

1. Field of the Invention

The present invention relates to an optical scanner reflecting/deflecting a light beam such as a laser beam for scanning an object.

2. Description of the Background Art

In general, a two-dimensional image apparatus such as a laser printer or a scanner is mounted with an optical scanner precisely scanning an object with a laser beam. This type of optical scanner reflects/deflects the laser beam with a light deflector such as a galvanometer mirror or a polygon mirror for scanning an objective surface of a photosensitive drum or the like. While the light deflector rotates at an equiangular velocity, the laser beam must scan the objective surface at a uniform rate. Therefore, the optical scanner employs an f-θ (ef-theta) lens as an optical system letting the laser beam reflected/deflected by the light deflector scan the objective surface at a uniform rate. The f-θ lens is an optical system having a distortion characteristic satisfying y=fω (f: focal distance, ω: half angle of view) in relation to an ideal image height y.

FIGS. 40 and 41 show a conventional optical scanner mounted with an f-θ lens 104. FIG. 40 is a schematic block diagram of the optical scanner developed along a Y-Z plane, and FIG. 41 is a longitudinal sectional view developing the optical scanner shown in FIG. 40 along an optical axis. Referring to FIGS. 40 and 41, numeral 100 denotes a light source (semiconductor laser), numeral 101 denotes a collimator lens, numeral 102 denotes a cylindrical lens, numeral 103 denotes a polygon mirror, numeral 104 denotes the f-θ lens, numeral 105 denotes an anamorphic lens and numeral 106 denotes an objective surface. Directions X, Y and Z shown in FIGS. 40 and 41 are perpendicular to each other.

The light source 100 oscillates a laser beam 107 directly modulated by a driving circuit (not shown). This laser beam 107 is parallelized by the collimator lens 101 and converged by the cylindrical lens 102 for forming a linear image on a reflecting surface 103r of the polygon mirror 103. The polygon mirror 103 rotates about a rotational axis 103c by tens of thousands of revolutions per minute and the f-θ lens 104 is an optical system converting equiangular velocity motion of incident light from the reflecting surface 103r to uniform motion, whereby a light beam reflected by the reflecting surface 103r of the polygon mirror 103 is deflected at an equilateral velocity and scans the objective surface 106 in the direction Y. The anamorphic lens 105 converges light incident from the f-θ lens 104 perpendicularly (direction X) to a primary scanning direction (direction Y) for forming an image on the objective surface 106.

As shown in FIG. 40, the light beam scans the objective surface 106 over a scanning line length W, and hence the f-θ lens 104 must have a wide total angle θ of view. Further, the size of an image has recently been so increased that an optical scanner having a large scanning line length W is required. Assuming that f represents the focal distance of the f-θ lens 104 at the working wavelength for the light beam, the following relational expression holds:

W=fθ

When the scanning line length W is enlarged while keeping the total angle θ of view constant, therefore, the focal distance f of the f-θ lens 104 is increased. In order to enlarge the scanning line length W while keeping the focal distance f of the f-θ lens 104 constant, on the other hand, the total angle θ of view must be increased. In this case, the aperture of the f-θ lens 104 is so increased that it is difficult to precisely work the f-θ lens 104 and correct optical aberration values thereof, to readily increase the cost for the f-θ lens 104.

Compactification of the optical scanner has also been required in recent years. As shown in FIG. 42, an f-θ lens 104 built in the optical scanner is formed by three groups of lenses, i.e., a first lens 111 having negative refracting power, a second lens 112 having positive refracting power and a third lens 113 having positive refracting power. Between the total length L (face-to-face distance between an entrance-side curved surface 111i of the first lens 111 and an exit-side curved surface 113e of the third lens 113) of the f-θ lens 104 and a focal distance f, the following relational expression holds:

$$0.100 \leq L/f \leq 0.108$$

Hence, the total length L exceeds 0.100×f. An f-θ lens having optical performance not deteriorated also when the total length L is further reduced has recently been required.

When the light source 100 is formed by a semiconductor laser, the oscillation wavelength of the semiconductor laser varies with the operating temperature. The imaging position of the light beam varies with change of the oscillation wavelength due to chromatic aberration of the f-θ lens 104, to result in such a problem that no stable beam spot is obtained on the objective surface 106 and resolution of the image is reduced. When the light output of the semiconductor laser is steeply increased, for example, the operating temperature of the semiconductor laser is abruptly increased and the wavelength of the laser beam shifts to a longer side. After the light output is stabilized, the operating temperature is reduced also in a laser burning state and hence the wavelength shifts to a shorter side. Further, the semiconductor laser exhibits such mode hopping that the central wavelength discontinuously varies with temperature change or instability of causing a large number of longitudinal modes at a low output. When the optical scanner has a wide range of application, the semiconductor laser must be oscillated between low and high outputs and hence it is required to improve chromatic aberration of the f-θ lens 104 to form a stable beam spot on the objective surface 106. When employing a semiconductor laser having a working wave range of 400 nm to 410 nm, for example, chromatic aberration of magnification of about 0.2 mm is caused on an end of an angle of view and it is difficult to obtain high resolution in the conventional f-θ lens 104 having the three groups of lenses 111, 112 and 113.

SUMMARY OF THE INVENTION

The present invention is directed to an optical scanner reflecting/deflecting a light beam such as a laser beam for scanning an object.

According to the present invention, the optical scanner comprises a light deflector periodically reflecting a light beam emitted from a light source to periodically deflect the light beam and an imaging optical system having such a distortion characteristic that the product of a focal distance and a half angle of view defines an ideal image height for imaging the light beam deflected by the light deflector on an objective surface, while the imaging optical system is constituted by arranging a first cemented lens, formed by bonding a first lens and a second lens to each other, having negative refracting power, a second cemented lens, formed by bonding a third lens and a fourth lens to each other, having positive refracting power and a fifth lens having positive refracting power successively from an entrance side for the light beam to satisfy the following expressions (1) and (2):

$$\frac{L}{f} < 0.100 \quad (1)$$

$$0.04 \leq \frac{r1}{r4} \leq 0.31 \quad (2)$$

where L represents the length between a plane of incidence of the first cemented lens and a plane of exit of the fifth lens along an optical axis direction and f represents the composite focal distance of the first cemented lens, the second cemented lens and the fifth lens in the above expression (1) while r1 represents the radius of curvature of a refracting interface on the entrance side for the light beam in the first lens and r4 represents the radius of curvature of a refracting interface on the entrance side for the light beam in the third lens in the above expression (2).

A compact imaging optical system having a small total length L as compared with a focal distance f can be constituted by satisfying the above expression (1), thereby implementing a compact optical scanner. Further, the imaging optical system can properly correct bending of a meridional image surface by satisfying the above expression (2). According to the present invention, both conditions of the above expressions (1) and (2) are compatible, whereby a compact optical scanner having high optical performance can be prepared.

Preferably, the first lens and the second lens are essentially made of an optical material satisfying the following expression (4) on the basis of a partial Abbe's number ν defined in the following expression (3):

$$\nu = \frac{N-1}{N_{MIN} - N_{MAX}} \quad (3)$$

$$0.48 \leq \frac{\nu 1}{\nu 2} \leq 0.64 \quad (4)$$

where N represents a refractive index with respect to the central wavelength of a working wave range of the light beam, $N_{MIN}$ represents a refractive index with respect to the lower limit of the working wave range of the light beam and $N_{MAX}$ represents a refractive index with respect to the upper limit of the working wave range of the light beam in the above expression (3) while ν1 represents the partial Abbe's number of the first lens and ν2 represents the partial Abbe's number of the second lens in the above expression (4).

An imaging optical system capable of correcting longitudinal chromatic aberration and chromatic aberration of magnification can be implemented by satisfying the above expression (4).

More preferably, the third lens and the fourth lens are essentially made of an optical material satisfying the following expression (5) on the basis of the partial Abbe's number ν defined in the following expression (3):

$$\nu = \frac{N-1}{N_{MIN} - N_{MAX}} \quad (3)$$

$$0.42 \leq \frac{\nu 4}{\nu 3} \leq 0.64 \quad (5)$$

where N represents the refractive index with respect to the central wavelength of the working wave range of the light beam, $N_{MIN}$ represents the refractive index with respect to the lower limit of the working wave range of the light beam and $N_{MAX}$ represents the refractive index with respect to the upper limit of the working wave range of the light beam in the above expression (3) while ν3 represents the partial Abbe's number of the third lens and ν4 represents the partial Abbe's number of the fourth lens in the above expression (5).

An imaging optical system capable of properly correcting longitudinal chromatic aberration and chromatic aberration of magnification can be implemented by satisfying the above expression (5).

More preferably, the imaging optical system satisfies the following expression (6):

$$0.24 \leq \frac{|f1|}{f} \leq 0.35 \quad (6)$$

where f1 represents the focal distance of the first cemented lens in the above expression (6).

An imaging optical system capable of further properly correcting bending of a meridional image surface can be implemented by satisfying the above expression (6).

More preferably, the imaging optical system satisfies the following expression (7):

$$0.43 \leq \frac{f3}{f} \leq 0.67 \quad (7)$$

where f3 represents the focal distance of the fifth lens in the above expression (7).

An imaging optical system capable of improving the scanning characteristic of the light beam can be implemented by satisfying the above expression (7).

More preferably, another imaging optical system converging the light beam emitted from the light source only in the direction of the rotational axis of the light deflector and imaging the light beam on a reflecting surface of the light deflector is further provided on an optical path between the light source and the light deflector, and the imaging optical system further comprises an anamorphic lens converging a light beam outgoing from the fifth lens in the direction of the rotational axis of the light deflector and imaging the light beam on the objective surface.

When displacement is present in perpendicularity of the reflecting surface of the light deflector, inclination of reflected light resulting from this displacement can be so corrected that the light beam can precisely scan the objective surface at a regular pitch.

When employing a light beam having a central wavelength of around 405 nm, the imaging optical system more preferably satisfies the following expression (2A):

$$0.04 \leq \frac{r1}{r4} \leq 0.17 \quad (2A)$$

A compact imaging optical system capable of properly correcting bending of a meridional image surface can be implemented particularly with respect to the light beam having the central wavelength of around 405 nm.

When employing the light beam having the central wavelength of around 405 nm, the optical material more preferably satisfies the following expression (4A) with respect to the light beam having the central wavelength of around 405 nm:

$$0.48 \leq \frac{v1}{v2} \leq 0.58 \quad (4A)$$

An imaging optical system capable of correcting longitudinal chromatic aberration and chromatic aberration of magnification within a proper range can be implemented particularly with respect to the light beam having the central wavelength of around 405 nm.

When employing the light beam having the central wavelength of around 405 nm, the optical material more preferably satisfies the following expression (5A) with respect to the light beam having the central wavelength of around 405 nm:

$$0.42 \leq \frac{v4}{v3} \leq 0.47 \quad (5A)$$

An imaging optical system capable of correcting longitudinal chromatic aberration and chromatic aberration of magnification within a proper range can be implemented particularly with respect to the light beam having the central wavelength of around 405 nm.

When employing the light beam having the central wavelength of around 405 nm, the imaging optical system more preferably satisfies the following expression (6A) with respect to the light beam having the central wavelength of around 405 nm:

$$0.24 \leq \frac{|f1|}{f} \leq 0.32 \quad (6A)$$

A compact imaging optical system capable of properly correcting bending of a meridional image surface can be implemented particularly with respect to the light beam having the central wavelength of around 405 nm.

When employing a light beam having a central wavelength of around 635 nm, the imaging optical system more preferably satisfies the following expression (2B):

$$0.13 \leq \frac{r1}{r4} \leq 0.31 \quad (2B)$$

A compact imaging optical system capable of properly correcting bending of a meridional image surface can be implemented particularly with respect to the light beam having the central wavelength of around 635 nm.

When employing the light beam having the central wavelength of around 635 nm, the optical material more preferably satisfies the following expression (4B) with respect to the light beam having the central wavelength of around 635 nm:

$$0.52 \leq \frac{v1}{v2} \leq 0.64 \quad (4B)$$

An imaging optical system capable of correcting longitudinal chromatic aberration and chromatic aberration of magnification within a proper range can be implemented particularly with respect to the light beam having the central wavelength of around 635 nm.

When employing the light beam having the central wavelength of around 635 nm, the optical material more preferably satisfies the following expression (5B) with respect to the light beam having the central wavelength of around 635 nm:

$$0.48 \leq \frac{v4}{v3} \leq 0.64 \quad (5B)$$

An imaging optical system capable of correcting longitudinal chromatic aberration and chromatic aberration of magnification within a proper range can be implemented particularly with respect to the light beam having the central wavelength of around 635 nm.

When employing the light beam having the central wavelength of around 635 nm, the imaging optical system more preferably satisfies the following expression (6B) with respect to the light beam having the central wavelength of around 635 nm:

$$0.28 \leq \frac{|f1|}{f} \leq 0.33 \quad (6B)$$

An imaging optical system capable of properly correcting bending of a meridional image surface can be implemented particularly with respect to the light beam having the central wavelength of around 635 nm.

When employing a light beam having a central wavelength of around 785 nm, the imaging optical system more preferably satisfies the following expression (2C):

$$0.15 \leq \frac{r1}{r4} \leq 0.22 \quad (2C)$$

A compact imaging optical system capable of properly correcting bending of a meridional image surface can be implemented particularly with respect to the light beam having the central wavelength of around 785 nm.

When employing the light beam having the central wavelength of around 785 nm, the optical material more preferably satisfies the following expression (4C) with respect to the light beam having the central wavelength of around 785 nm:

$$0.61 \leq \frac{v1}{v2} \leq 0.64 \quad (4C)$$

An imaging optical system capable of correcting longitudinal chromatic aberration and chromatic aberration of magnification within a proper range can be implemented particularly with respect to the light beam having the central wavelength of around 785 nm.

When employing the light beam having the central wavelength of around 785 nm, the optical material more preferably satisfies the following expression (5C) with respect to the light beam having the central wavelength of around 785 nm:

$$0.57 \leq \frac{v4}{v3} \leq 0.64 \quad (5C)$$

An imaging optical system capable of correcting longitudinal chromatic aberration and chromatic aberration of magnification within a proper range can be implemented particularly with respect to the light beam having the central wavelength of around 785 nm.

When employing the light beam having the central wavelength of around 785 nm, the imaging optical system more preferably satisfies the following expression (6C) with respect to the light beam having the central wavelength of around 785 nm:

$$0.30 \le \frac{|f|}{f} \le 0.35 \tag{6C}$$

An imaging optical system capable of properly correcting bending of a meridional image surface can be implemented particularly with respect to the light beam having the central wavelength of around 785 nm.

Accordingly, objects of the present invention are:

(1) to provide a compact optical scanner by implementing an f-θ lens having a small total length L and high optical performance also when a focal distance f as well as a scanning line length W are increased; and (2) to implement an f-θ lens having high chromatic aberration correctability.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram showing the overall structure of an optical scanner according to each preferred embodiment of the present invention;

FIG. 2 is a longitudinal sectional view developing the optical scanner shown in FIG. 1 along an optical axis;

FIG. 6 is a lateral aberration diagram of the f-θ lens according to the first example of the first preferred embodiment;

FIG. 7 is a lateral aberration diagram of the f-θ lens according to the first example of the first preferred embodiment;

FIG. 8 is a lateral aberration diagram of the f-θ lens according to the first example of the first preferred embodiment;

FIG. 9 is a lateral aberration diagram of the f-θ lens according to the first example of the first preferred embodiment;

FIG. 13 is a schematic sectional view of an f-θ lens according to a second example of the first preferred embodiment;

FIG. 15 is an astigmatism diagram of the f-θ lens according to the second example of the first preferred embodiment;

FIG. 22 is a schematic sectional view of an f-θ lens according to an example of a second preferred embodiment of the present invention;

DESCRIPTION OF THE PREFERRED EMBODIMENTS

Figure 3:
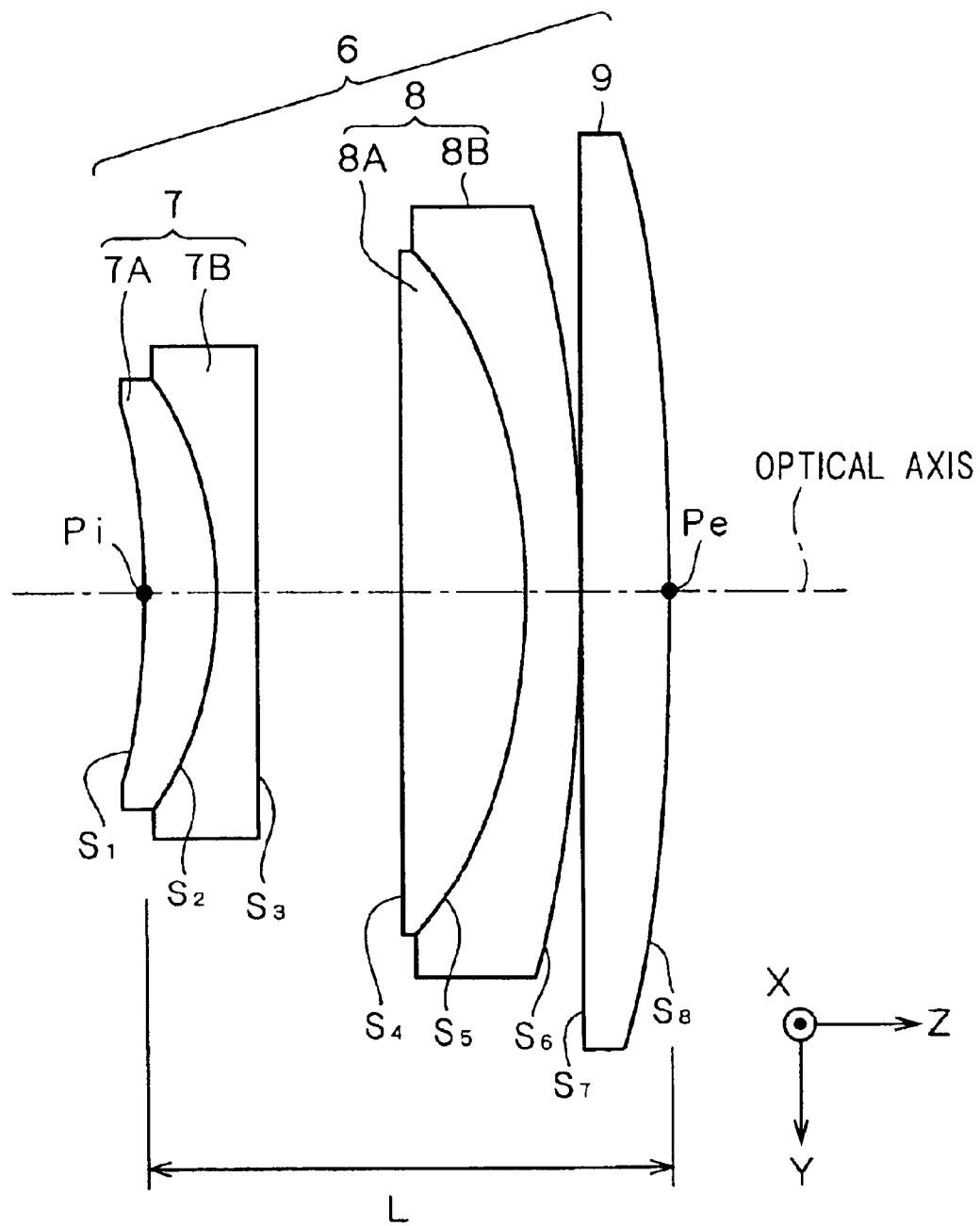
FIG. 3 is a schematic sectional view of an exemplary f-θ lens according to each preferred embodiment.

Preferred embodiments of the present invention are now described.

Overall Structure of Optical Scanner

FIG. 1 is a schematic diagram showing the overall structure of an optical scanner according to each embodiment of the present invention. Directions X, Y and Z shown in FIG. 1 are perpendicular to each other. FIG. 1 shows the schematic structure of the optical scanner developed along a Y-Z plane parallel to the plane of FIG. 1. FIG. 2 is a longitudinal sectional view developing the optical scanner shown in FIG. 1 along an optical axis.

This optical scanner comprises a first imaging optical system consisting of a collimator lens 2 and a cylindrical lens 3, a plane mirror 4, a light deflector (polygon mirror) 5 having a rotating polygon mirror and a second imaging optical system consisting of an f-θ lens 6 and an anamorphic lens 10. While this embodiment employs the polygon mirror as the light deflector 5, the present invention is not restricted to this but a galvanometer mirror or the like may alternatively be employed.

A light source 1 consisting of a semiconductor laser oscillates a light beam 12 having a prescribed central wavelength and outputs the same toward the collimator lens 2. In the first imaging optical system, the collimator lens 2 refracts the incident light beam 12 to a parallel beam. Then, the cylindrical lens 3 converges incident light 12a from the collimator lens 2 only in the direction (direction X) of a rotational axis 5c of the light deflector 5. A light beam 12b outgoing from the cylindrical lens 3 is reflected by the plane mirror 4 and thereafter forms a linear image on a reflecting surface 5r of the light deflector 5.

The reflecting surface 5r of the light deflector 5 is parallelly worked with respect to the rotational axis 5c. This reflecting surface 5r rotates about the rotational axis 5c clockwise at a high equiangular velocity for deflecting the light beam 12c reflected by the reflecting surface 5c in the direction (direction Z) of the optical axis of the f-θ lens 6 for performing scanning. The f-θ lens 6 forming the second imaging optical system, having such a distortion characteristic that the product of a focal distance f and a half angle ω of view defines an ideal image height y, lets the incident light beam 12c deflected at the equiangular velocity scan an objective surface 11 in a primary scanning direction (direction Y).

The anamorphic lens 10 converges a light beam 12d incident from the f-θ lens 6 in a secondary scanning direction (direction X) perpendicular to the primary scanning direction (direction Y) and also perpendicular to the optical axis of the f-θ lens 6 for forming an image on the objective surface 11. This anamorphic lens 10 has a characteristic of correcting inclination of reflected light resulting from displacement of perpendicularity of the reflecting surface 5r of the light deflector 5 (pyramidal error correction) and a characteristic of correcting bending of a sagittal image surface described later. The light deflector 5 is formed with a plurality of reflecting surfaces in a sectionally polygonal manner. Each reflecting surface may be slightly radially inclined from the direction of the rotational axis 5c due to dispersion in accuracy of finishing. The direction of deflection of the light beam 12c incident upon the f-θ lens 6 is slightly displaced in the direction X due to such inclination of the reflecting surface. According to this embodiment, the anamorphic lens 10 converging the light beam 12d in the secondary scanning direction is introduced as shown in FIG. 2, whereby the reflecting surface 5r of the light deflector 5 and a final image surface on the objective surface 11 are in optically conjugate relation. Even if the traveling direction of the light beam 12c is slightly displaced due to inclination of the reflecting surface 5r, therefore, the light beam 12c can perform scanning to an imaging point conjugate to the reflecting surface 5r, so that the light beam 12c can precisely scan the objective surface 11 at a uniform velocity (uniform pitch).

The f-θ lens 6 forms bent image surfaces in a meridional image surface and the sagittal image surface. In general, a beam on a plane (meridional plane) including the optical axis of the f-θ lens 6 and a principal ray defines a meridional beam. In this optical scanner, the meridional plane is a Y-Z plane including the optical axis of the f-θ lens 6 and parallel to the primary scanning direction (direction Y), and the meridional image surface is an image surface formed by the meridional beam on the meridional plane. A beam including the principal ray and perpendicular to the meridional beam defines a sagittal beam, and the sagittal image surface is defined as an image surface formed by the sagittal beam. As described later, the f-θ lens 6 according to this embodiment has optical performance capable of correcting bending of the meridional image surface. Further, the anamorphic lens 10, having refracting power in the primary scanning direction (direction Y) and that in the secondary scanning direction (direction X) different from each other, has optical performance of converging and imaging the incident light beam 12d in the secondary scanning direction while correcting bending of the sagittal image surface thereof.

While the anamorphic lens 10 and the f-θ lens 6 are separated from each other in this embodiment, the present invention is not restricted to this but the anamorphic lens 10 may alternatively be integrated with the f-θ lens 6 as a partial component thereof.

As shown in FIG. 1, the light beam 12a directed toward the cylindrical lens 3 from the collimator lens 2 in the first imaging optical system reaches the plane mirror 4 across an optical path between the f-θ lens 6 and the anamorphic lens 10 in the second imaging optical system and is reflected by the same, for forming an image on a mirror surface of the light deflector 5. A necessary optical path length can be ensured in the limited space of the optical scanner due to such arrangement of the first and second imaging optical systems, whereby the optical scanner can be designed compact. Further, the degree of freedom in design is increased as the total length L of the f-θ lens 6 is reduced, whereby the optical scanner can be readily compactified.

Structure of f-θ Lens

FIG. 3 is a schematic sectional view showing an exemplary f-θ lens 6 according to this embodiment. This f-θ lens 6 is constituted by three groups of five lenses, i.e., a first cemented lens 7 formed by bonding a first lens 7A having positive refracting power and a second lens 7B having negative refracting power to each other, a second cemented lens 8 formed by bonding a third lens 8A having positive refracting power and a fourth lens 8B having negative refracting power to each other and a fifth lens 9 having positive refracting power successively from an entrance side for the light beam 12c. The refracting power of each lens is defined as the inverse number of the focal distance of this lens.

The f-θ lens 6 has the dimension of the total length L in the optical axis direction. More specifically, the total length L denotes the distance between a point Pi on the optical axis of a refracting interface $S_1$ of the first cemented lens 7 on an entrance side for the light beam 12c and a point Pe on the optical axis of a refracting interface $S_8$ of the fifth lens 9 on an exit side for the light beam 12d. Assuming that f represents the focal distance of the f-θ lens 6, i.e., the composite focal distance of the first to fifth lenses 7A to 9, the f-θ lens 6 is formed to satisfy the following conditional expression (1):

$$\frac{L}{f} < 0.100 \tag{1}$$

The f-θ lens 6 having the total length L extremely small as compared with the focal distance f can be prepared by satisfying the above expression (1).

Assuming that r1 represents the radius of curvature of the refracting interface $S_1$ of the first lens 7A on the exit side for the light beam 12c and r4 represents the radius of curvature of a refracting interface $S_5$ of the third lens 8A on the exit side for the light beam 12d, the f-θ lens 6 is formed to further satisfy the following conditional expression (2):

$$0.04 \leq \frac{r1}{r4} \leq 0.31 \tag{2}$$

The f-θ lens 6 can correct bending of the meridional image surface by satisfying the above expression (2). When the ratio r1/r4 exceeds the upper limit (=0.31) of the above expression (2), the meridional image surface is bent toward a plus side with respect to a longitudinal image point and overcorrected. When the ratio r1/r4 is less than the lower limit (=0.04) of the above expression (2), on the other hand, the meridional image surface is bent toward a minus side with respect to the longitudinal image point and undercorrected. Therefore, the f-θ lens 6 can properly flatten the meridional image surface by setting the ratio r1/r4 in the numerical range defined by the above expression (2). In the field of a laser printer, for example, the spot diameter of the light beam 12d scanning the objective surface 11 is preferably small in order to obtain an image of high resolution. The f-θ lens 6 can uniformly suppress the spot diameter of the light beam 12d scanning the objective surface 11 by correcting image surface bending.

Hyaline or an optical plastic material defined by a partial Abbe's number ν is preferably selected as the optical materials for the first and second cemented lenses 7 and 8. The partial Abbe's number ν is defined as follows:

$$\nu = \frac{N-1}{N_{MIN} - N_{MAX}} \tag{3}$$

where N represents the refractive index of the optical material with respect to the central wavelength of the light beam 12c, $N_{MIN}$ represents the refractive index of the optical material with respect to the lower limit (minimum wavelength) of the working wave range of the light beam 12c and $N_{MAX}$ represents the refractive index of the optical material with respect to the upper limit (maximum wavelength) of the working wave range of the light beam 12c in the above expression (3). The dominator of the partial Abbe's number ν expresses refractive index change with respect to wavelength change between the maximum and minimum wavelengths of the light beam 12c, and the partial Abbe's number ν expresses the ratio of the refractive index N with respect to the refractive index change. Dispersiveness of the optical material is increased as the partial Abbe's number ν is reduced, while the former is reduced as the latter is increased.

As to the first cemented lens 7, the following conditional expression (4) preferably holds between the partial Abbe's number ν1 of the first lens 7A having positive refracting power and the partial Abbe's number ν2 of the second lens 7B having negative refracting power:

$$0.48 \leq \frac{\nu 1}{\nu 2} \leq 0.64 \tag{4}$$

Chromatic aberration includes longitudinal chromatic aberration (difference in imaging position on an optical axis varying with the wavelength of a light beam) and chromatic aberration of magnification (difference in imaging position on an images height direction varying with the wavelength of the light beam). Both of longitudinal chromatic aberration and chromatic aberration of magnification of the f-θ lens 6 can be corrected by selecting dispersiveness of the optical material for the first lens 7A to be higher than that of the optical material for the second lens 7B and setting the ratio ν1/ν2 within the numerical range defined by the above expression (4).

As to the second cemented lens 8, further, the following conditional expression (5) preferably holds between the partial Abbe's number ν3 of the third lens 8A having positive refracting power and the partial Abbe's number ν4 of the fourth lens 8B having negative refracting power:

$$0.42 \leq \frac{\nu 4}{\nu 3} \leq 0.64 \tag{5}$$

Both of longitudinal chromatic aberration and chromatic aberration of magnification of the f-θ lens 6 can be corrected within tolerance by selecting dispersiveness of the optical material for the third lens 8A to be higher than that of the optical material for the fourth lens 8B and setting the ratio ν4/ν3 within the numerical range defined by the above expression (5). Thus, it is possible to precisely perform correction of chromatic aberration of magnification, which has been hard to attain in an f-θ lens formed by three groups of three lenses, by noting the ratios ν1/ν2 and ν4/ν3 of the partial Abbe's numbers of the pairs of single lenses 7A, 7B, 8A and 8B forming the aforementioned cemented lenses 7 and 8 respectively for establishing the above expressions (4) and (5).

In order to correct curvature of field of the aforementioned f-θ lens 6, the following conditional expression (6) preferably holds as to the composite focal distance f1 (<0) of the first cemented lens 7:

$$0.24 \leq \frac{|f1|}{f} \leq 0.35 \tag{6}$$

The f-θ lens 6 can further properly correct bending of the meridional image surface by satisfying the above expression (6). When the ratio |f1|/f exceeds the upper limit (=0.35) of the above expression (6), the meridional image surface is bent toward a plus side with respect to a longitudinal image point and overcorrected. When the ratio |f1|/f is less than the lower limit (=0.24) of the above expression (6), on the other hand, the meridional image surface is bent toward a minus side with respect to the longitudinal image point and undercorrected. Therefore, the f-θ lens 6 can properly flatten the meridional image surface by setting the ratio |f1|/f within the numerical range defined by the above expression (6).

In order to improve the scanning characteristic (linearity) of the light beam 12d forming an image on the objective surface 11, the following conditional expression (7) preferably holds as to the focal distance f3 (>0) of the aforementioned fifth lens 9:

$$0.43 \leq \frac{f3}{f} \leq 0.67 \tag{7}$$

The above expression (7) expresses setting of the ratio f3/f of the focal distance f3 of the fifth lens 9 to the focal distance f of the f-θ lens 6 within a prescribed range. When the ratio f3/f exceeds the upper limit (=0.67) of the above expression (7), the scanning rate of the light beam 12d on the objective surface 11 is retarded toward the peripheral portion from the central portion. When the ratio f3/f is less than the lower limit (=0.43) of the above expression (7), on the other hand, the scanning rate is quickened toward the peripheral portion from the central portion. When the above conditional expression (7) is satisfied, therefore, time change of the scanning rate is suppressed within tolerance so that the light beam 12d can precisely scan the objective surface 11 at a regular pitch for enabling improvement of picture quality.

More specific modes of the f-θ lens 6 having the aforementioned structure are now described.

First Preferred Embodiment

An f-θ lens 6 according to a first preferred embodiment of the present invention is designed to be preferable as to a light beam having a working wave range of a central wavelength of 405 nm, a maximum wavelength of 410 nm and a minimum wavelength of 400 nm. In order to optimize optical performance with respect to this working wave range in particular, the f-θ lens 6 preferably satisfies the following conditional expressions (2A), (4A), (5A) and (6A):

$$0.04 \leq \frac{r1}{r4} \leq 0.17 \tag{2A}$$

$$0.48 \leq \frac{v1}{v2} \leq 0.58 \tag{4A}$$

$$0.42 \leq \frac{v4}{v3} \leq 0.47 \tag{5A}$$

$$0.24 \leq \frac{|f1|}{f} \leq 0.32 \tag{6A}$$

First Example

An f-θ lens 6 according to a first example of this embodiment is now described. FIG. 3 is a schematic sectional view of the f-θ lens 6 according to the first example. Table 1 shows the focal distance f, the F-number and the total angle θ of view of the f-θ lens 6 according to the first example and a working wave range of a laser beam oscillated in a light source 1.

TABLE 1

| | |
|---|---|
| F-Number | F/41 |
| Focal Distance (f) | f = 693.5 mm |
| Total Angle of View (θ) | 45.44° |
| Central Wavelength ($\lambda_0$) | $\lambda_0$ = 405 nm |
| Upper Limit of Working Wave Range ($\lambda_{max}$) | $\lambda_{max}$ = 410 nm |
| Lower Limit of Working Wave Range ($\lambda_{min}$) | $\lambda_{min}$ = 400 nm |

Table 2 shows values indicating optical characteristics of the f-θ lens 6 according to the first example.

TABLE 2

| i | r(i) | d(i) | $n_d(i)$ | $v_d(i)$ |
|---|---|---|---|---|
| 1 | −120.4 | 9.8 | 1.62588 | 35.7 |
| 2 | −46.75 | 5.0 | 1.60738 | 56.8 |
| 3 | ∞ | 17.4 | | |
| 4 | −2150.0 | 15.3 | 1.60300 | 65.5 |
| 5 | −66.64 | 7.0 | 1.64769 | 33.8 |
| 6 | −181.0 | 0.5 | | |
| 7 | −1172.0 | 10.0 | 1.65160 | 58.5 |
| 8 | −214.7 | | | |

As shown in FIG. 3, first to fifth lenses 7A to 9 have refracting interfaces $S_1$, $S_2$, $S_3$, $S_4$, $S_5$, $S_6$, $S_7$ and $S_8$ respectively. Table 2 shows the radii r(1), r(2), r(3), r(4), r(5), r(6), r(7) and r(8) of curvature of the refracting interfaces $S_1$, $S_2$, $S_3$, $S_4$, $S_5$, $S_6$, $S_7$ and $S_8$ respectively and the face-to-face distance d(i) between an i-th refracting interface $S_i$ (i: integer of 1 to 7) and an i+1-th refracting interface $S_{i+1}$ on an optical axis. The total sum of face-to-face distances d(i) related to the refracting interfaces $S_1$ to $S_7$ is equal to the total length L of the f-θ lens 6. $S_1$ denotes an entrance-side refracting interface of the first lens 7A, $S_2$ denotes an exit-side of refracting interface of the first lens 7A, $S_3$ denotes an exit-side refracting interface of the second lens 7B, $S_4$ denotes an entrance-side refracting interface of the third lens 8A, $S_5$ denotes an exit-side refracting interface of the third lens 8A, $S_6$ denotes an exit-side refracting interface of the fourth lens 8B, $S_7$ denotes an entrance-side refracting interface of the fifth lens 9 and $S_8$ denotes an exit-side refracting interface of the fifth lens 9. Referring to Table 2, r(3)=∞. This means that the refracting interface $S_3$ has a flat shape with zero curvature.

In the above Table 2, $n_d(1)$, $n_d(2)$, $n_d(4)$, $n_d(5)$ and $n_d(7)$ denote the refractive indices of the first, second, third, fourth and fifth lenses 7A, 7B, 8A, 8B and 9 on d-line respectively, and $v_d(1)$, $v_d(2)$, $v_d(4)$, $v_d(5)$ and $v_d(7)$ represent the Abbe's numbers of the first, second, third, fourth and fifth lenses 7A, 7B, 8A, 8B and 9 on d-line respectively.

The numerical values of the ratios used in the above conditional expressions (1), (2), (4), (5), (6) and (7) are as follows:

| | | | |
|---|---|---|---|
| L/f = 0.094 | | | |
| r1/r4 = 0.056 | | | |
| v1/v2 = 0.55 | | | |
| N1 = 1.657577 | N1u = 1.655935 | N1L = 1.659306 | v1 = 195 |
| N2 = 1.625521 | N2u = 1.624657 | N2L = 1.626421 | v2 = 355 |
| v4/v3 = 0.439 | | | |
| N3 = 1.618444 | N3u = 1.617718 | N3L = 1.6192 | v3 = 417 |
| N4 = 1.682559 | N4u = 1.680743 | N4L = 1.684471 | v4 = 183 |
| |f1|/f = 0.303 | f1 = −210.359436803 | | |
| f3/f = 0.563 | f3 = 390.491479719 | | | where N1 represents the refractive index of the first lens 7A with respect to the central wavelength 405 nm, N1u represents the refractive index of the first lens 7A with respect to the maximum wavelength 410 nm, N1L represents the refractive index of the first lens 7A with respect to the minimum wavelength 400 nm, N2 represents the refractive index of the second lens 7B with respect to the central wavelength 405 nm, N2u represents the refractive index of the second lens 7B with respect to the maximum wavelength 410 nm, N2L represents the refractive index of the second lens 7B with respect to the minimum wavelength 400 nm, N3 represents the refractive index of the third lens 8A with respect to the central wavelength 405 nm, N3u represents the refractive index of the third lens 8A with respect to the maximum wavelength 410 nm, N3L represents the refractive index of the third lens 8A with respect to the minimum wavelength 400 nm, N4 represents the refractive index of the fourth lens 8B with respect to the central wavelength 405 nm, N4u represents the refractive index of the fourth lens 8B with respect to the maximum wavelength 410 nm and N4L represents the refractive index of the fourth lens 8B with respect to the minimum wavelength 400 nm respectively.

It is understood that the numerical values of the aforementioned ratios L/f, r1/r4, v1/v2, v4/v3, |f1|/f and f3/f satisfy the conditional expressions (1), (2A), (4A) and (7) in the first example.

Figure 4:
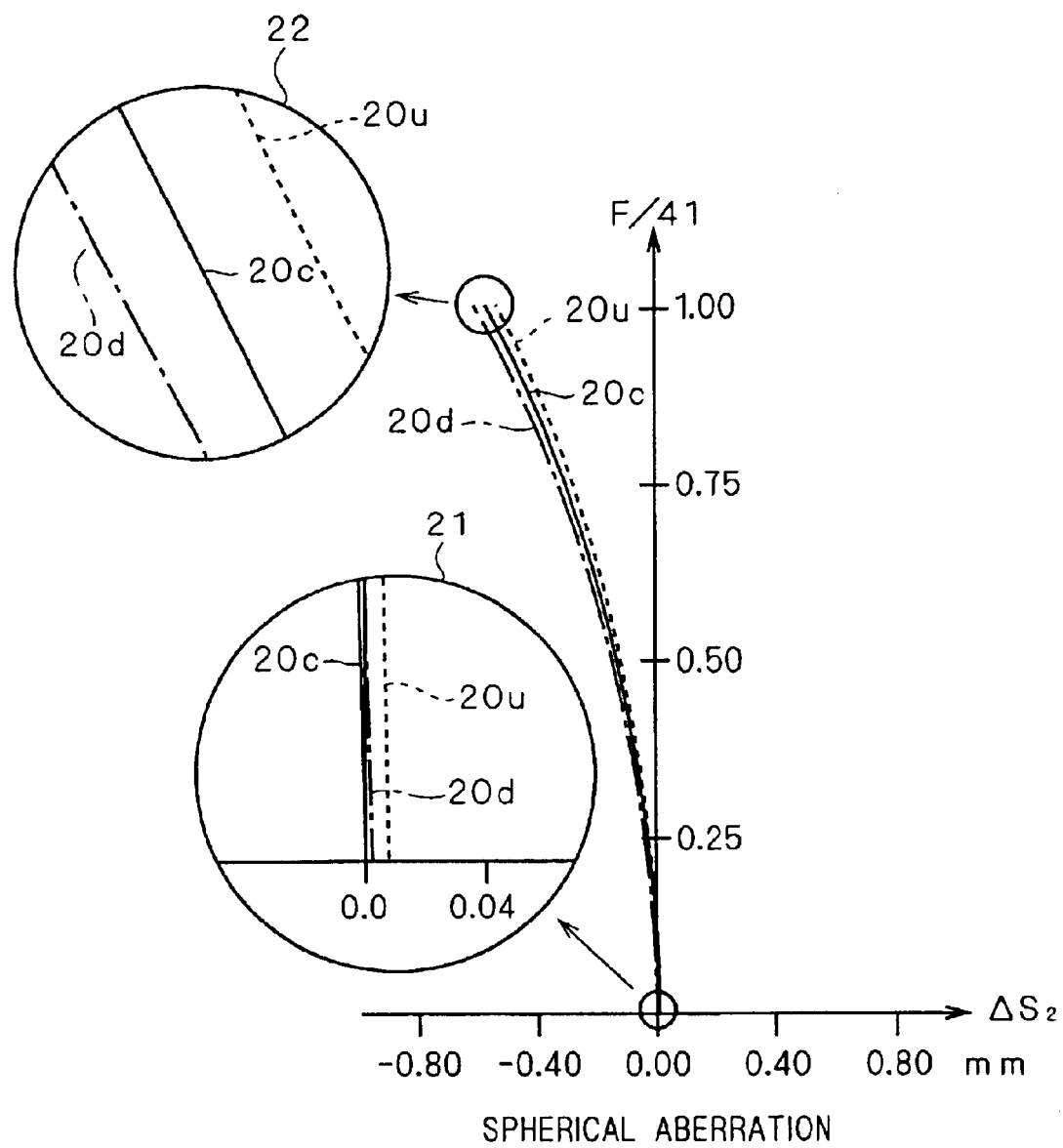
FIG. 4 is a spherical aberration diagram of an f-θ lens according to a first example of a first preferred embodiment of the present invention.

Spherical aberration (longitudinal aberration) of the f-θ lens 6 having the aforementioned optical characteristics was measured. FIG. 4 is a spherical aberration diagram related to the light beam having the working wave range of three wavelengths (405 nm, 400 nm and 410 nm). A point where the light beam refracted by the f-θ lens 6 intersects with the optical axis varies with the height of entrance in an entrance pupil (radius of the entrance pupil). Referring to the spherical aberration diagram of FIG. 4, the vertical axis shows pupil coordinates standardizing an end of the radius of the entrance pupil to "1", and the horizontal axis shows the position where the light beam refracted by the f-θ lens 6 intersects with the optical axis, i.e., spherical aberration $\Delta S_2$ (unit: mm). Aberration curves 20c, 20u and 20d correspond to the wavelengths 405 nm, 410 nm and 400 nm of the light beam respectively. Referring to FIG. 4, further, numeral 21 denotes a partially enlarged view showing the aberration curves 20c, 20u and 20d around pupil coordinates exhibiting the value zero and numeral 22 denotes a partially enlarged view showing the aberration curves 20c, 20u and 20d around pupil coordinates exhibiting the value "1".

It has been recognized from the result of measurement of the spherical aberration $\Delta S_2$ shown in FIG. 4 that longitudinal chromatic aberration between the minimum wavelength 400 nm and the maximum wavelength 410 nm is 0.0081 mm and the longitudinal chromatic aberration was properly corrected.

Figure 5:
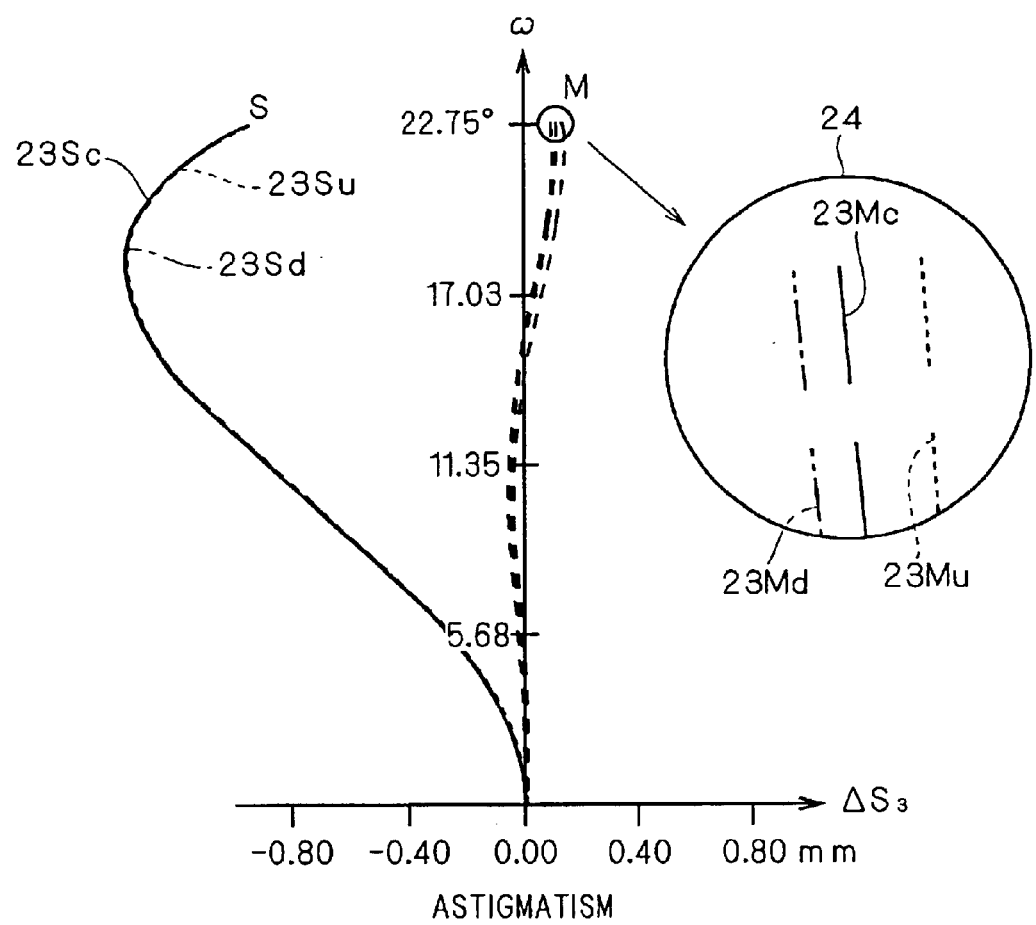
FIG. 5 is an astigmatism diagram of the f-θ lens according to the first example of the first preferred embodiment.

Astigmatism (longitudinal aberration) of the f-θ lens 6 according to the first example was measured. FIG. 5 is an astigmatism diagram related to the light beam having the working wave range of three wavelengths (405 nm, 400 nm and 410 nm). Referring to FIG. 5, the horizontal axis shows displacement $\Delta S_3$ (unit: mm) of a meridional image surface and a sagittal image surface of each wavelength from a longitudinal image point, and the vertical axis shows a half angle ω of view (unit: °). Referring to FIG. 5, further, numeral 23Sc denotes the sagittal image surface of the beam having the central wavelength 405 nm, numeral 23Su denotes the sagittal image surface of the beam having the maximum wavelength 410 nm and numeral 23Sd denotes the sagittal image surface of the beam having the minimum wavelength 400 nm, while numeral 23Mc denotes the meridional image surface of the beam having the central wavelength 405 nm, numeral 23Mu denotes the meridional image surface of the beam having the maximum wavelength 410 nm and numeral 23Md denotes the meridional image surface of the beam having the minimum wavelength 400 nm. Referring to FIG. 5, numeral 24 denotes a partially enlarged view showing aberration curves 23Mu, 23Mc and 23Md around a half angle ω of view reaching 22.75°.

It is understood from the aberration diagram shown in FIG. 5 that the meridional image surface of each wavelength is relatively flatly corrected.

Lateral aberration of the f-θ lens 6 according to the first example was measured. Each of FIGS. 6 to 11 is a lateral aberration diagram of the f-θ lens 6 related to the light beam having the working wave range of three wavelengths (405 nm, 400 nm and 410 nm). Lateral aberration is defined as displacement of an image point penetrated by a beam passing through the position of a height h* of an entrance pupil from an image point of a principal ray. Referring to each of FIGS. 6 to 11, the horizontal axis shows the height h* of the entrance pupil. Referring to each of FIGS. 6, 8 and 10, the vertical axis shows lateral aberration $\Delta Y$ (unit: mm) in the direction Y as to a meridional beam. Referring to each of FIGS. 7, 9 and 11, the vertical axis shows lateral aberration $\Delta X$ (unit: mm) in the direction X as to a sagittal beam.

Figure 10:
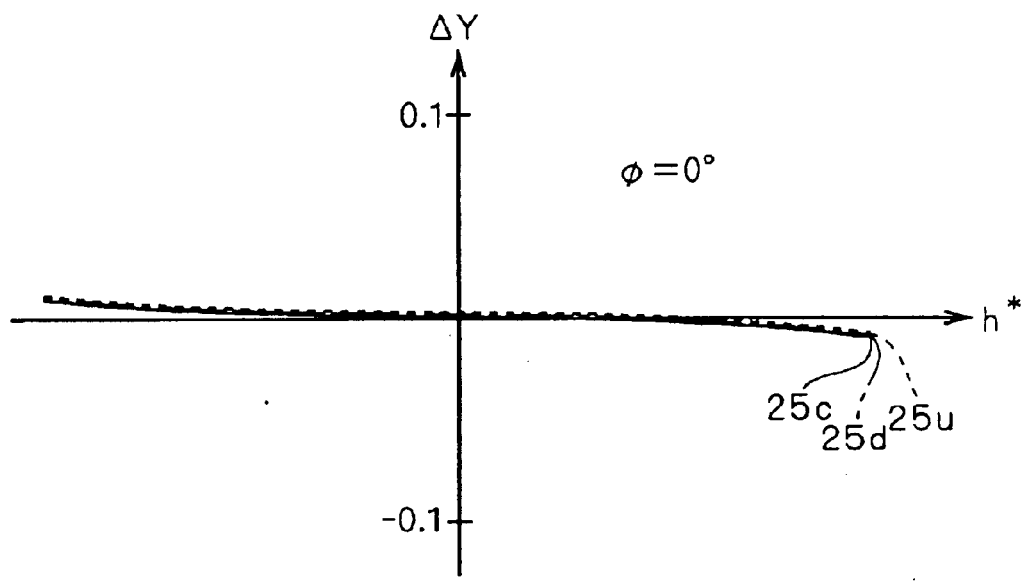
FIG. 10 is a lateral aberration diagram of the f-θ lens according to the first example of the first preferred embodiment.
Figure 11:
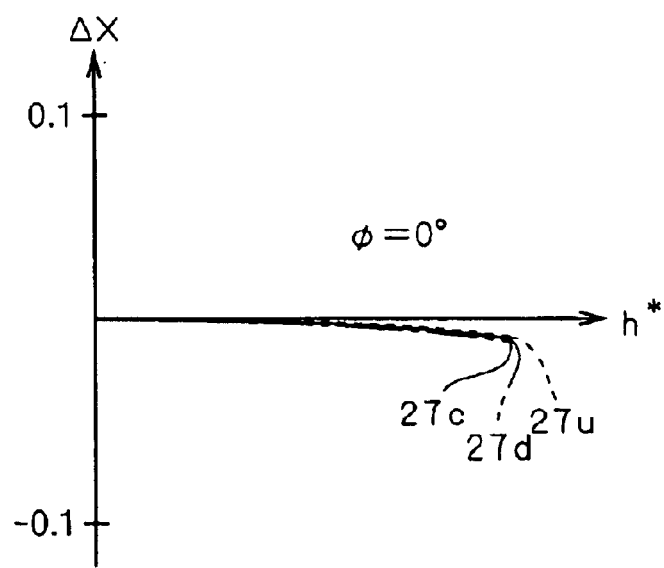
FIG. 11 is a lateral aberration diagram of the f-θ lens according to the first example of the first preferred embodiment.

Assuming that φ represents an angle formed by the direction of deflection of the principal ray reflected/deflected by the light deflector 5 and the optical axis of the f-θ lens 6, FIGS. 6 and 7 are lateral aberration diagrams for an angle φ of 22.70°, FIGS. 8 and 9 are lateral aberration diagrams for an angle φ of 15.89° and FIGS. 10 and 11 are lateral aberration diagrams for an angle φ of 0° respectively.

Each of FIGS. 6 to 11 displays wavelength change of lateral aberration. Each of FIGS. 6, 8 and 10 displays aberration curves 25c, 25u and 25d of beams of the central, maximum and minimum wavelengths 405 nm, 410 nm and 400 nm respectively. Referring to each of FIGS. 6 and 8, numeral 26 denotes a partially enlarged view of the aberration curves 25c, 25u and 25d around the height h* of the entrance pupil reaching zero respectively. Each of FIGS. 7, 9 and 11 displays aberration curves 27c, 27u an 27d of the beams of the central, maximum and minimum wavelengths 405 nm, 410 nm and 400 nm respectively.

It has been confirmed from the results of measurement of lateral aberration shown in FIGS. 6 to 11 that chromatic aberration of magnification in the working wave range of 400 nm to 410 nm is 0.0036 mm at the maximum and chromatic aberration of magnification has been properly corrected.

As to an f-θ characteristic indexing the scanning characteristic of the f-θ lens 6 according to the first example, an excellent numerical value of 0.29% was obtained. The f-θ characteristic is measured along the following procedures A to E:

Procedure A: The total angle θ of view of the f-θ lens 6 is equally divided into 10 for calculating an average rotational angle <θ> of a light deflector 5 as follows:

<θ>=θ/10/2

Figure 12:
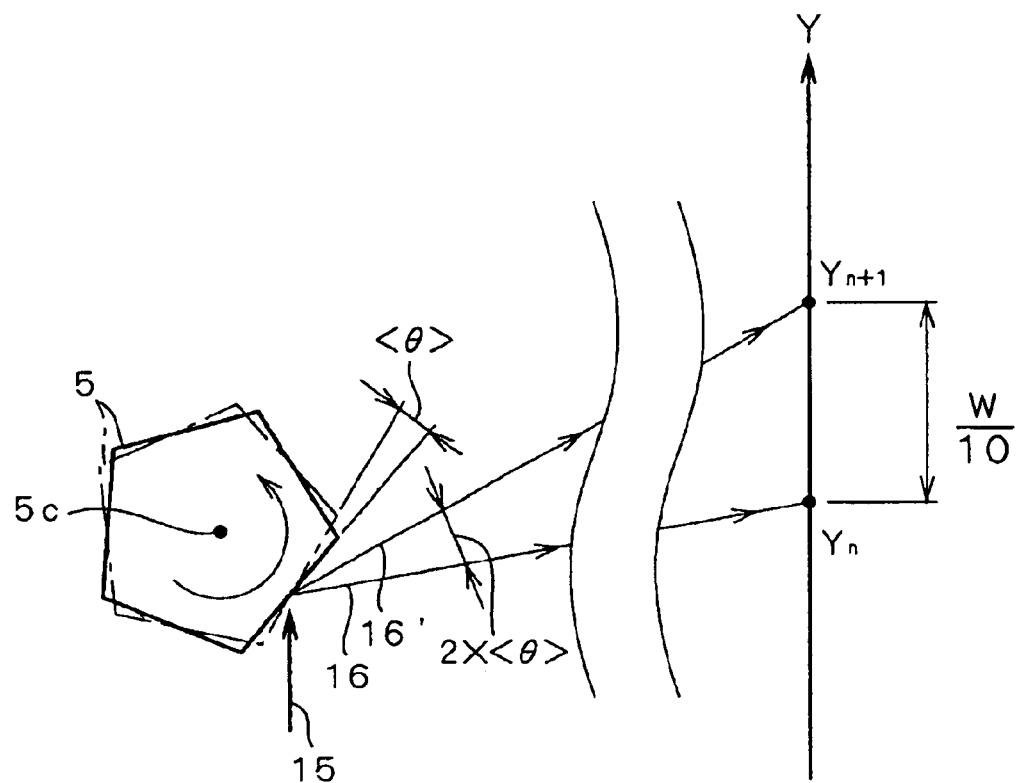
FIG. 12 is a diagram for illustrating f-θ characteristics.

As shown in FIG. 12, incident light 15 is reflected by the light deflector 5 with respect to the average rotational angle <θ> of the light deflector 5, and deflected from a light beam 16 to a light beam 16' with angle change 2×<θ>. In an ideal state where a light beam scans an objective surface 11 at a uniform rate, the scanning distance of the light beam with respect to the average rotational angle <θ> is W/10 (W=fθ: scanning line length).

Procedure B: The position of the objective surface 11 irradiated with the light beam is measured at each point when the light deflector 5 rotates by the average rotational angle <θ>. Thus, 11 irradiated positions $Y_1$ to $Y_{11}$ are measured in a period between starting and ending of single scanning. In the ideal state where the light beam scans the objective surface 11 at a uniform rate, the irradiated positions $Y_1$ to $Y_{11}$ are expressed as follows assuming that $Y_1$ represents a scanning start position on the objective surface 11:

$$Y_2 = Y_1 + \frac{W}{10}$$

$$Y_3 = Y_2 + \frac{W}{10}$$

...

$$Y_{n+1} = Y_n + \frac{W}{10}$$

$$Y_{11} = Y_{10} + \frac{W}{10}$$

Procedure C: The object distance $Y_{n+1}-Y_n$ (n=1 to 10) between each adjacent pair of irradiated positions is calculated. This object distance $Y_{n+1}-Y_n$ is conceivably substantially proportionate to the scanning rate of the light beam between each adjacent pair of irradiated positions.

Procedure D: The ratio $D_n$ of the object distance $Y_{n+1}-Y_n$ to the inter-irradiated position distance W/10 in the ideal state is calculated. This ratio $D_n$ (n=1 to 10) is calculated along the following expression (8):

$$D_n = (Y_{n+1} - Y_n)/(W/10) \quad (8)$$

Procedure E: Assuming that $D_{max}$ and $D_{min}$ represent the maximum and minimum values of the ratio $D_n$ (n=1 to 10) respectively and $D_{ave}$ represents the arithmetic mean of the ratio $D_n$, the f-θ characteristic (unit: percent) is calculated along the following expression (9):

$$f\text{-}\theta \text{ Characteristic} = 100 \times (D_{max} - D_{min})/D_{ave} \quad (9)$$

As the value of the f-θ characteristic is reduced, linearity of the f-θ lens 6 is so improved that the light beam can scan the objective surface 11 at a regular pitch.

Table 3 shows measured values of the aforementioned irradiated position $Y_n$, the aforementioned distance $Y_{n+1}-Y_n$ and the aforementioned ratio $D_n$.

Table 4 shows the maximum value $D_{max}$, the minimum value $D_{min}$ and the arithmetic mean $D_{ave}$ of the ratio $D_n$ and the values of the f-θ characteristic calculated through the measured values in Table 3.

TABLE 4

| | |
|---|---|
| $D_{max}$ | 1.00286 |
| $D_{min}$ | 1.00000 |
| $D_{ave}$ | 1.00151 |
| f-θ Characteristic | 0.29% |

Second Example

An f-θ lens 6 according to a second example of the first preferred embodiment is now described. FIG. 13 is a schematic sectional view of the f-θ lens 6 according to the second example. Table 5 shows the focal distance f, the F-number and the total angle θ of view of the f-θ lens 6 according to the second example and a working wave range of a laser beam oscillated in a light source 1.

TABLE 5

| | |
|---|---|
| F-Number | F/41 |
| Focal Distance (f) | f = 692.5 mm |
| Total Angle of View (θ) | 45.5° |
| Central Wavelength ($\lambda_0$) | $\lambda_0$ = 405 nm |
| Upper Limit of Working Wave Range ($\lambda_{max}$) | $\lambda_{max}$ = 410 nm |
| Lower Limit of Working Wave Range ($\lambda_{min}$) | $\lambda_{min}$ = 400 nm |

Table 6 shows values indicating optical characteristics of the f-θ lens 6 according to the second example.

TABLE 6

| i | r(i) | d(i) | $n_d$(i) | $\nu_d$(i) |
|---|---|---|---|---|
| 1 | −116.07936 | 11.959432 | 1.63980 | 34.5 |
| 2 | −42.26902 | 5.000000 | 1.62230 | 53.2 |
| 3 | ∞ | 14.345617 | | |
| 4 | −2431.05107 | 15.857296 | 1.61800 | 63.4 |
| 5 | −64.82406 | 7.000000 | 1.67270 | 32.1 |
| 6 | −159.27833 | 0.837654 | | |
| 7 | −1762.10814 | 10.000000 | 1.64000 | 60.1 |
| 8 | −248.71440 | | | |

TABLE 3

$D_n = (Y_{n+1} - Y_n)/(W/10)$

| N | 1 | 2 | 3 | 4 | 5 |
|---|---|---|---|---|---|
| $Y_{n+1}$ | 275.41528 | 220.31487 | 165.15774 | 110.04522 | 55.00039 |
| $Y_n$ | 220.31487 | 165.15774 | 110.04522 | 55.00039 | 0.00018 |
| $Y_{n+1} - Y_n$ | 55.10041 | 55.15713 | 55.11252 | 55.04483 | 55.00021 |
| $D_n$ | 1.00183 | 1.00286 | 1.00205 | 1.00082 | 1.00000 |

| N | 6 | 7 | 8 | 9 | 10 |
|---|---|---|---|---|---|
| $Y_{n+1}$ | 0.00018 | −55.00004 | −110.04494 | −165.15764 | −220.31487 |
| $Y_n$ | −55.00004 | −110.04494 | −165.15764 | −220.31487 | −275.41521 |
| $Y_{n+1} - Y_n$ | 55.00022 | 55.04490 | 55.11270 | 55.15723 | 55.10034 |
| $D_n$ | 1.00000 | 1.00082 | 1.00205 | 1.00286 | 1.00182 |

Numerical values of various ratios used in the above conditional expressions (1), (2), (4), (5), (6) and (7) are as follows:

L/f = 0.094
r1/r4 = 0.048
ν1/ν2 = 0.578
N1 = 1.673489    N1u = 1.67174     N1L = 1.67533     ν1 = 188
N2 = 1.642343    N2u = 1.641375    N2L = 1.643353    ν2 = 325
ν4/ν3 = 0.428
N3 = 1.634451    N3u = 1.633674    N3L = 1.635261    ν3 = 400
N4 = 1.711115    N4u = 1.709095    N4L = 1.713245    ν4 = 171
|f1|/f = 0.287   f1 = −198.626971124
f3/f = 0.634     f3 = 439.101300826

It is understood that the numerical values of the aforementioned ratios L/f, r1/r4, ν1/ν2, ν4/ν3, |f1|/f and f3/f satisfy the conditional expressions (1), (2A), (4A), (5A), (6A) and (7) in the second example.

Longitudinal chromatic aberration, astigmatism, chromatic aberration of magnification and an f-θ characteristic of the f-θ lens 6 having the aforementioned optical characteristics were measured by a method similar to that in the aforementioned first example.

Figure 14:
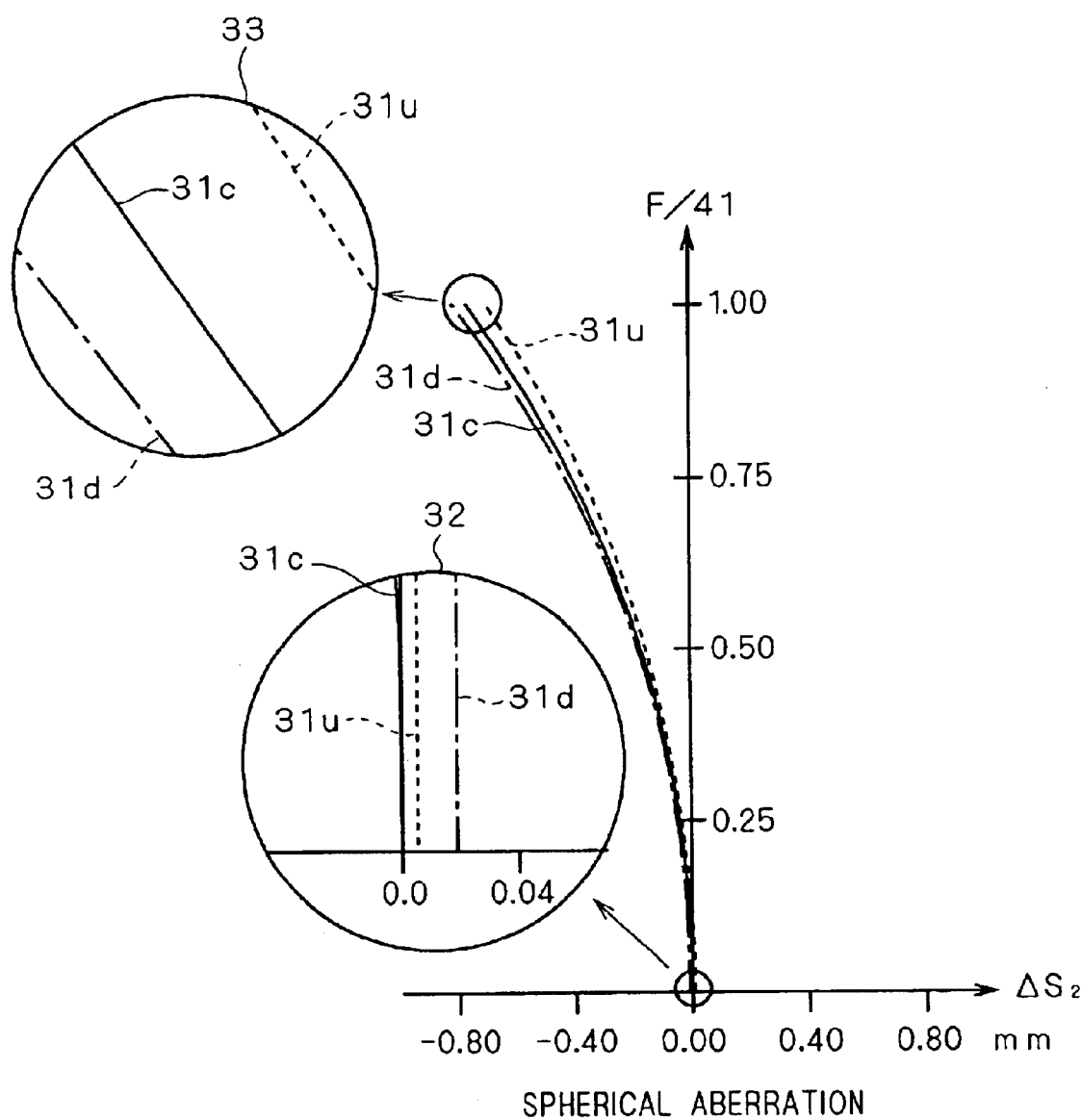
FIG. 14 is a spherical aberration diagram of the f-θ lens according to the second example of the first preferred embodiment.

FIG. 14 is a spherical aberration diagram related to a light beam having a working wave range of three wavelengths (405 nm, 400 nm and 410 nm). The aberration diagram shown in FIG. 14 plots aberration curves 31c, 31u and 31d with respect to the central, maximum and minimum wavelengths 405 nm, 410 nm and 400 nm respectively. Referring to FIG. 14, numeral 32 denotes a partially enlarged view showing the aberration curves 31c, 31u an 31d around pupil coordinates exhibiting the value zero and numeral 33 denotes a partially enlarged view showing the aberration curves 31c, 31u and 31d around pupil coordinates exhibiting the value "1". It has been recognized from the result of measurement of spherical aberration $\Delta S_2$ shown in FIG. 14 that longitudinal chromatic aberration between the maximum wavelength 410 nm and the minimum wavelength 400 nm is 0.0196 nm and the longitudinal chromatic aberration was properly corrected.

FIG. 15 is an astigmatism diagram related to the light beam having the working wave range of three wavelengths (405 nm, 400 nm and 410 nm). Referring to FIG. 15, numeral 34Sc denotes a sagittal image surface of a beam having the central wavelength 405 nm, numeral 34Su denotes a sagittal image surface of a beam having the maximum wavelength 410 nm and numeral 34Sd denotes a sagittal image surface of a beam having the minimum wavelength 400 nm, while numeral 34Mc denotes a meridional image surface of the beam having the central wavelength 405 nm, numeral 34Mu denotes a meridional image surface of the beam having the maximum wavelength 410 nm and numeral 34Md denotes a meridional image surface of the beam having the minimum wavelength 400 nm. Referring to FIG. 15, numeral 35 denotes a partially enlarged view showing aberration curves 34Mu, 34Mc and 34Md around a half angle ω of view reaching 22.75°.

It is understood from the aberration diagram shown in FIG. 15 that the meridional image surface of each wavelength is relatively flatly corrected.

Figure 16:
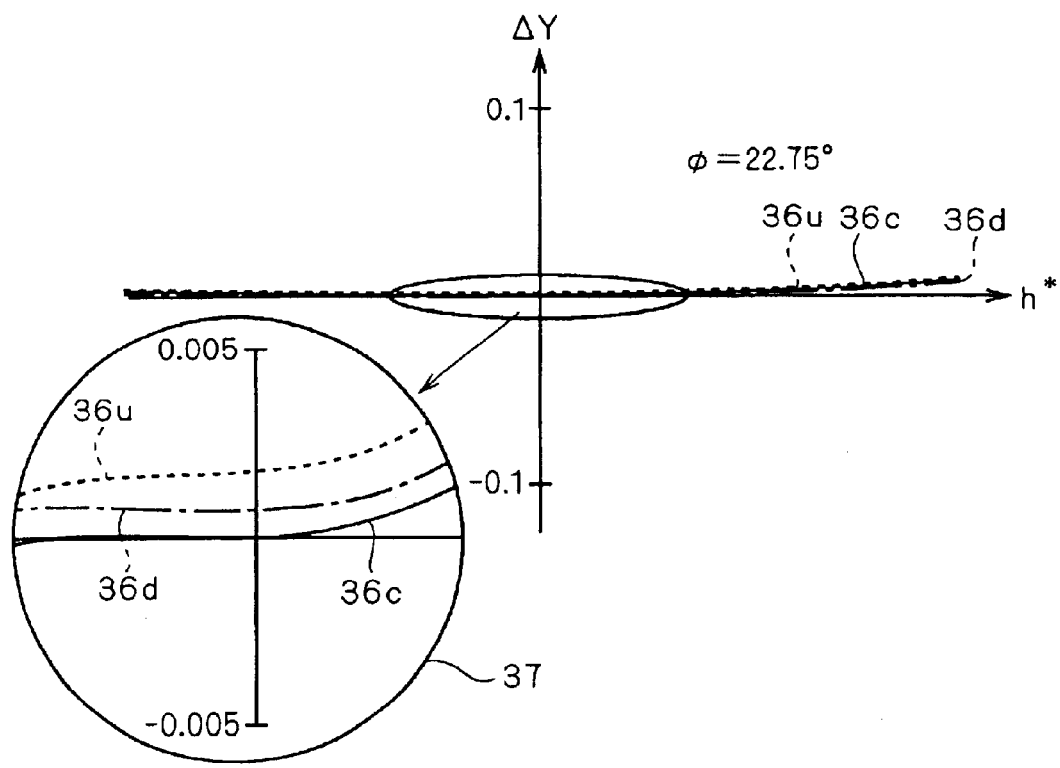
FIG. 16 is a lateral aberration diagram of the f-θ lens according to the second example of the first preferred embodiment.
Figure 17:
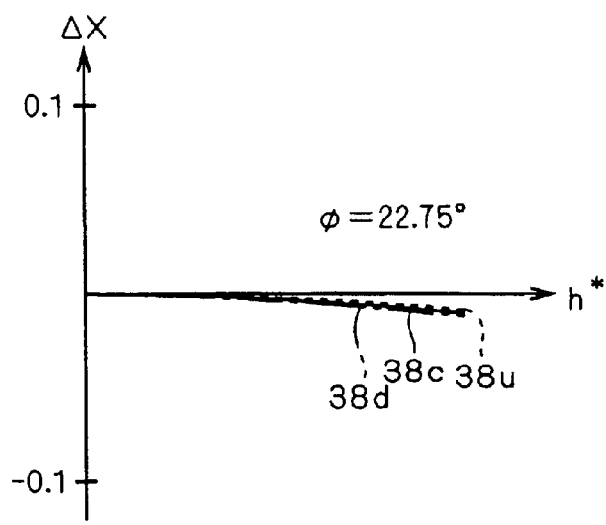
FIG. 17 is a lateral aberration diagram of the f-θ lens according to the second example of the first preferred embodiment.
Figure 18:
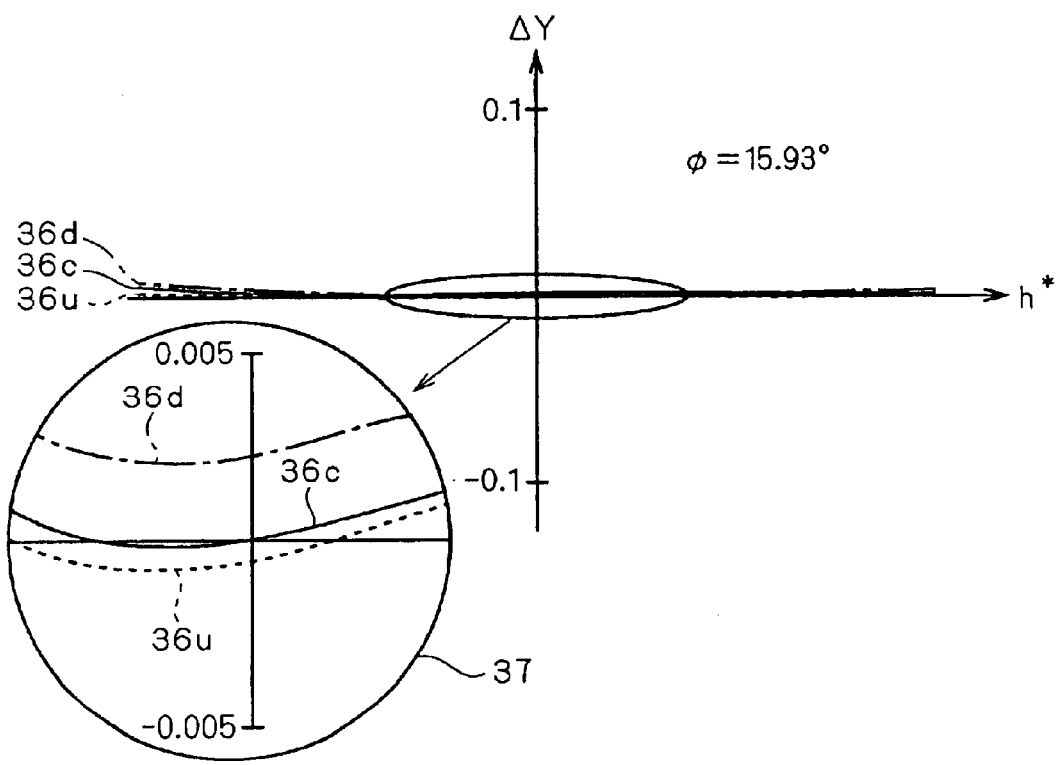
FIG. 18 is a lateral aberration diagram of the f-θ lens according to the second example of the first preferred embodiment.
Figure 19:
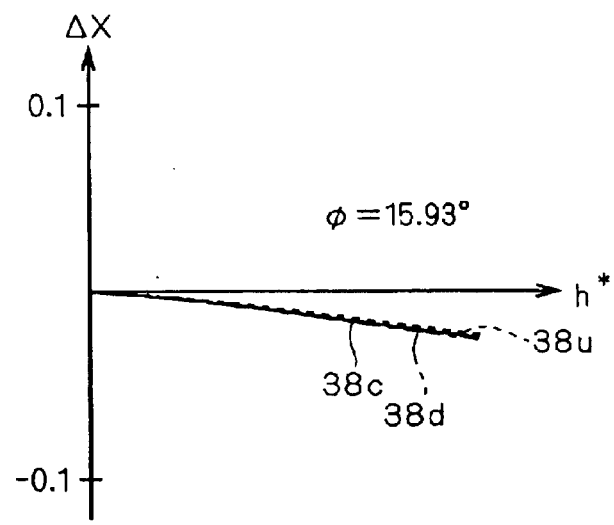
FIG. 19 is a lateral aberration diagram of the f-θ lens according to the second example of the first preferred embodiment.
Figure 20:
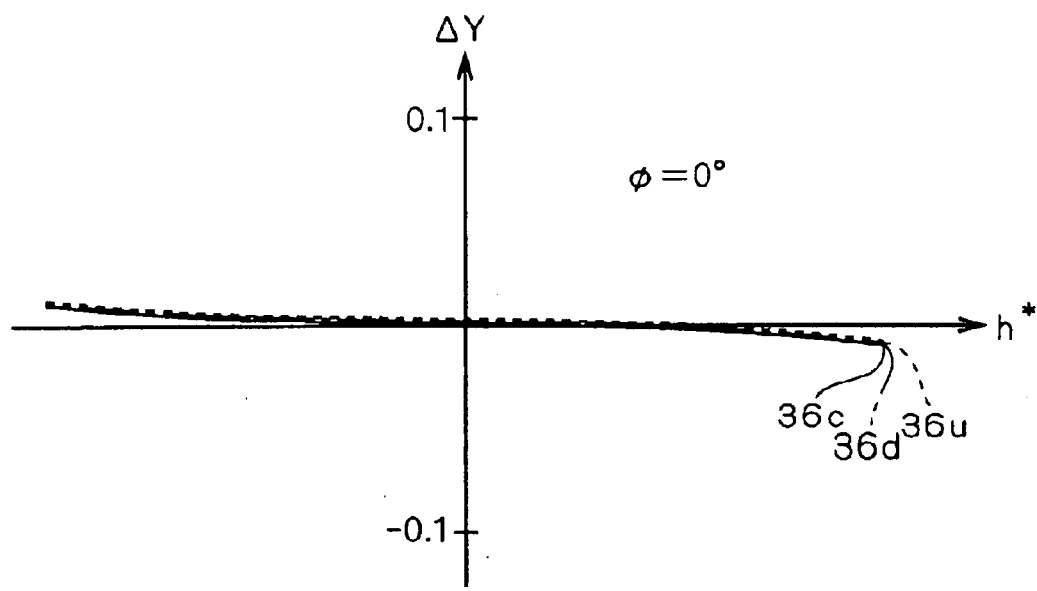
FIG. 20 is a lateral aberration diagram of the f-θ lens according to the second example of the first preferred embodiment.

Each of FIGS. 16 to 21 is a lateral aberration diagram of the f-θ lens 6 related to the light beam having the working wave range of three wavelengths (405 nm, 400 mm and 410 nm). FIGS. 16, 18 and 20 show lateral aberration ΔY as to meridional beams for the aforementioned angles φ of 22.75°, 15.93° and 0° respectively. Referring to these figures, numerals 36c, 36u and 36d denote aberration curves of beams having the central, maximum and minimum wavelengths 405 nm, 410 nm and 400 nm respectively. Referring to each of FIGS. 16 and 18, numeral 37 denotes a partially enlarged view of the aberration curves 36c, 36u and 36d around the height h* of an entrance pupil reaching zero respectively.

Figure 21:
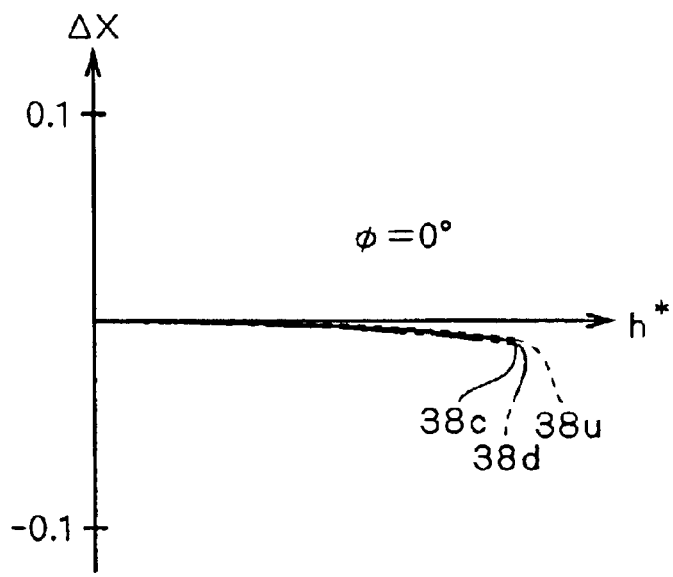
FIG. 21 is a lateral aberration diagram of the f-θ lens according to the second example of the first preferred embodiment.

FIGS. 17, 19 and 21 show lateral aberration ΔX as to sagittal beams for the angles φ of 22.75°, 15.93° and 0° respectively. Referring to these figures, numerals 38c, 38u and 38d denote aberration curves of the beams having the central, maximum and minimum wavelengths 405 nm, 410 nm and 400 nm respectively.

It has been confirmed from the results of measurement of lateral aberration shown in FIGS. 16 to 21 that chromatic aberration of magnification in the working wave range of 400 nm to 410 nm is 0.0025 mm at the maximum and chromatic aberration of magnification has been properly corrected.

As to the f-θ characteristic of the f-θ lens 6 according to the second example, an excellent numerical value of 0.33% was obtained. Table 7 shows measured values of each irradiated position $Y_n$, each distance $Y_{n+1}-Y_n$ and each ratio $D_n$.

TABLE 7

| | $D_n = (Y_{n+1}-Y_n)/(W/10)$ | | | | |
|---|---|---|---|---|---|
| N | 1 | 2 | 3 | 4 | 5 |
| $Y_{n+1}$ | 275.51389 | 220.36394 | 165.17847 | 110.05186 | 55.00166 |
| $Y_n$ | 220.36394 | 165.17847 | 110.05186 | 55.00166 | 0.00019 |
| $Y_{n+1}-Y_n$ | 55.14995 | 55.18546 | 55.12661 | 55.05020 | 55.00147 |
| $D_n$ | 1.00273 | 1.00337 | 1.00230 | 1.00091 | 1.00003 |
| N | 6 | 7 | 8 | 9 | 10 |
| $Y_{n+1}$ | 0.00019 | −55.00131 | −110.05164 | −165.17844 | −220.36394 |
| $Y_n$ | −55.00131 | −110.05164 | −165.17844 | −220.36394 | −275.51380 |
| $Y_{n+1}-Y_n$ | 55.00150 | 55.05033 | 55.12680 | 55.18551 | 55.14985 |
| $D_n$ | 1.00003 | 1.00092 | 1.00231 | 1.00337 | 1.00272 |

Table 8 shows the maximum value $D_{max}$, the minimum value $D_{min}$ and the arithmetic mean $D_{ave}$ of the ratio $D_n$ and the values of the f-θ characteristic calculated through the measured values in Table 7.

TABLE 8

| | |
|---|---|
| $D_{max}$ | 1.00337 |
| $D_{min}$ | 1.00003 |
| $D_{ave}$ | 1.00187 |
| f-θ Characteristic | 0.33% |

Second Preferred Embodiment

An f-θ lens 6 according to a second preferred embodiment of the present invention is now described. This f-θ lens 6 is designed to be preferable as to a light beam having a working wave range of a central wavelength of 635 nm, a maximum wavelength of 645 nm and a minimum wavelength of 625 nm. In order to optimize optical performance with respect to this working wave range in particular, the f-θ lens 6 preferably satisfies the following conditional expressions (2B), (4B), (5B) and (6B):

$$0.13 \le \frac{r1}{r4} \le 0.31 \quad (2B)$$

$$0.59 \le \frac{v1}{v2} \le 0.64 \quad (4B)$$

$$0.48 \le \frac{v4}{v3} \le 0.64 \quad (5B)$$

$$0.28 \le \frac{|f1|}{f} \le 0.33 \quad (6B)$$

An example of the f-θ lens 6 according to this embodiment is now described. FIG. 22 is a schematic sectional view of the f-θ lens 6 according to this example. Table 9 shows the focal distance f, the F-number and the total angle θ of view of the f-θ lens 6 according to this example and a working wave range of a laser beam oscillated in a light source 1.

TABLE 9

| | |
|---|---|
| F-Number | F/31.5 |
| Focal Distance (f) | f = 700 mm |
| Total Angle of View (θ) | 45° |
| Central Wavelength ($\lambda_0$) | $\lambda_0$ = 635 nm |
| Upper Limit of Working Wave Range ($\lambda_{max}$) | $\lambda_{max}$ = 645 nm |
| Lower Limit of Working Wave Range ($\lambda_{min}$) | $\lambda_{min}$ = 625 nm |

Table 10 shows values indicating optical characteristics of the f-θ lens 6 according to this example.

TABLE 10

| I | r(i) | d(i) | $n_d(i)$ | $v_d(i)$ |
|---|---|---|---|---|
| 1 | −129.59152 | 8.413322 | 1.71736 | 29.5 |
| 2 | −43.61373 | 3.000000 | 1.70000 | 48.1 |
| 3 | −1057.81883 | 18.762723 | | |
| 4 | −428.70762 | 20.000000 | 1.72000 | 46.0 |
| 5 | −52.07674 | 4.323955 | 1.74000 | 28.3 |
| 6 | −203.20428 | 0.500000 | | |
| 7 | 26100.37502 | 10.000000 | 1.63854 | 55.4 |
| 8 | −207.43205 | | | |

Numerical values of various ratios used in the above conditional expressions (1), (2), (4), (5), (6) and (7) are as follows:

| | | | |
|---|---|---|---|
| L/f = 0.093 | | | |
| r1/r4 = 0.302 | | | |
| v1/v2 = 0.639 | | | |
| N1 = 1.712251 | N1u = 1.711324 | N1L = 1.713225 | v1 = 375 |
| N2 = 1.69684 | N2u = 1.69626 | N2L = 1.697448 | v2 = 587 |
| v4/v3 = 0.639 | | | |
| N3 = 1.716618 | N3u = 1.715997 | N3L = 1.717268 | v3 = 564 |
| N4 = 1.73451 | N4u = 1.733516 | N4L = 1.735556 | v4 = 360 |
| |f1|/f = 0.321 | f1 = −224.682692012 | | |
| f3/f = 0.462 | f3 = 323.617309591 | | | where N1 represents the refractive index of a first lens 7A with respect to the central wavelength 635 nm, N1u represents the refractive index of the first lens 7A with respect to the maximum wavelength 645 nm, N1L represents the refractive index of the first lens 7A with respect to the minimum wavelength 625 nm, N2 represents the refractive index of a second lens 7B with respect to the central wavelength 635 nm, N2u represents the refractive index of the second lens 7B with respect to the maximum wavelength 645 nm, N2L represents the refractive index of the second lens 7B with respect to the minimum wavelength 625 nm, N3 represents the refractive index of a third lens 8A with respect to the central wavelength 635 nm, N3u represents the refractive index of the third lens 8A with respect to the maximum wavelength 645 nm, N3L represents the refractive index of the third lens 8A with respect to the minimum wavelength 625 nm, N4 represents the refractive index of a fourth lens 8B with respect to the central wavelength 635 nm, N4u represents the refractive index of the fourth lens 8B with respect to the maximum wavelength 645 nm and N4L represents the refractive index of the fourth lens 8B with respect to the minimum wavelength 625 nm.

It is understood that the numerical values of the aforementioned ratios L/f, r1/r4, v1/v2, v4/v3, |f1|/f and f3/f satisfy the conditional expressions (1), (2B), (4B), (5B), (6B) and (7) in this example.

Longitudinal chromatic aberration, astigmatism, chromatic aberration of magnification and an f-θ characteristic of the f-θ lens 6 having the aforementioned optical characteristics were measured by a method similar to that in the aforementioned first preferred embodiment.

Figure 23:
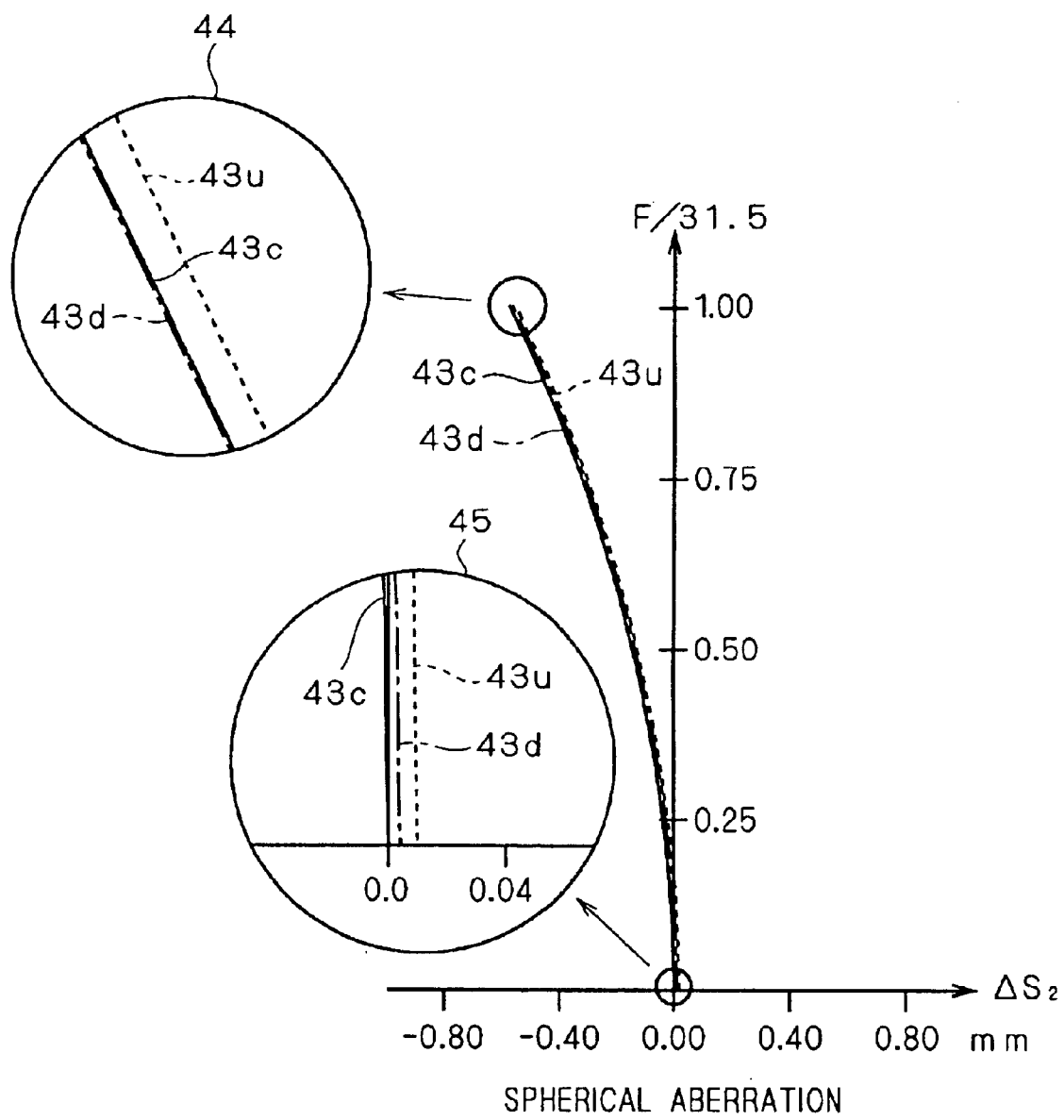
FIG. 23 is a spherical aberration diagram of the f-θ lens according to the example of the second preferred embodiment.

FIG. 23 is a spherical aberration diagram of the f-θ lens 6 related to a light beam having a working wave range of three wavelengths (635 nm, 625 nm and 645 nm). The aberration diagram shown in FIG. 23 plots aberration curves 43c, 43u and 43d with respect to the central, maximum and minimum wavelengths 635 nm, 645 nm and 625 nm respectively. Referring to FIG. 23, numeral 45 denotes a partially enlarged view showing the aberration curves 43c, 43u an 43d around pupil coordinates exhibiting the value zero and numeral 44 denotes a partially enlarged view showing the aberration curves 43c, 43u and 43d around pupil coordinates exhibiting the value "1". It has been recognized from the result of measurement of spherical aberration $\Delta S_2$ shown in FIG. 23 that longitudinal chromatic aberration between the maximum wavelength 645 nm and the minimum wavelength 625 nm is 0.0528 mm and the longitudinal chromatic aberration was properly corrected.

Figure 24:
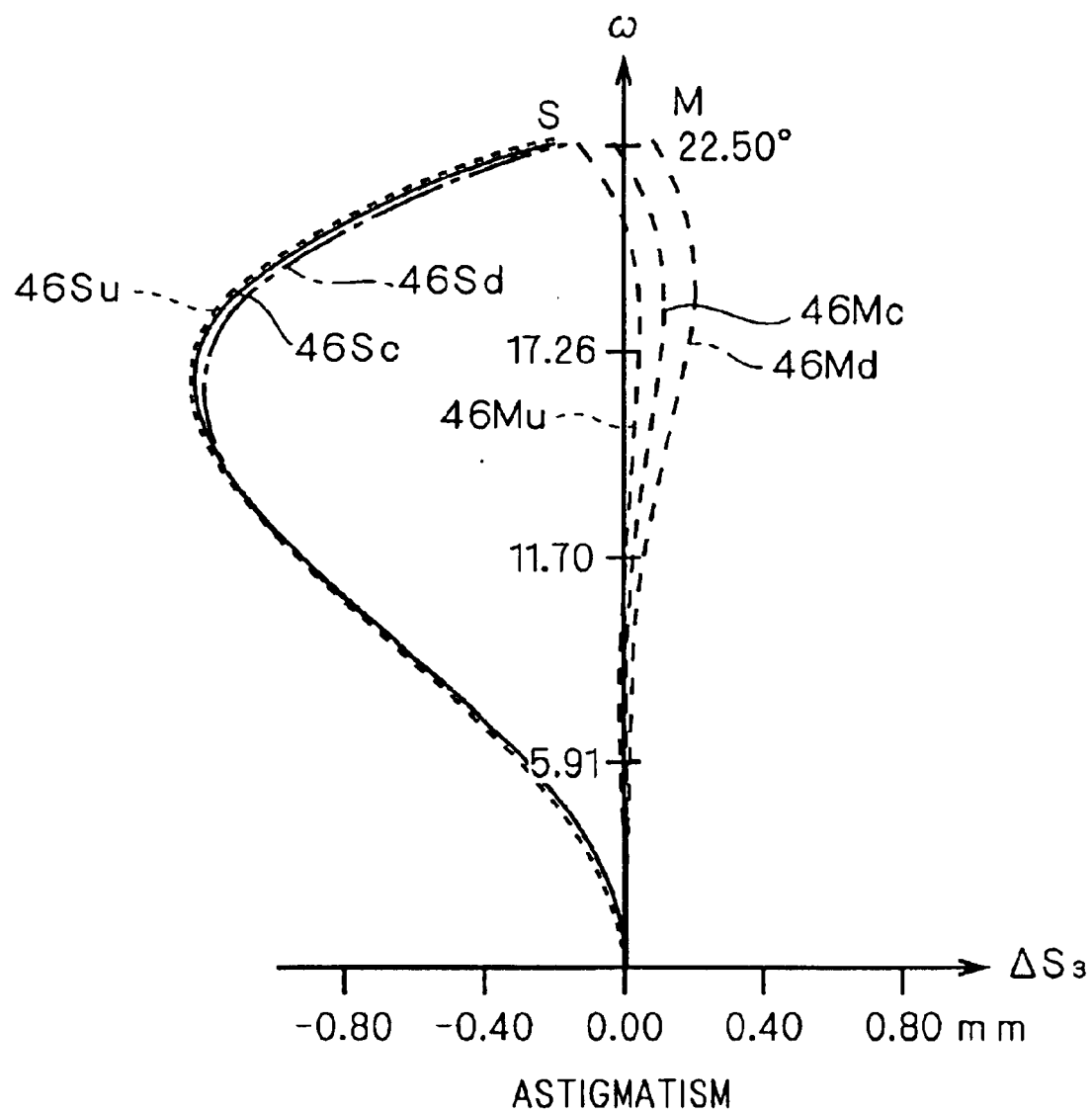
FIG. 24 is an astigmatism diagram of the f-θ lens according to the example of the second preferred embodiment.

FIG. 24 is an astigmatism diagram related to the light beam having the working wave range of three wavelengths (635 nm, 625 nm and 645 nm). Referring to FIG. 24, numeral 46Sc denotes a sagittal image surface of a beam having the central wavelength 635 nm, numeral 46Su denotes a sagittal image surface of a beam having the maximum wavelength 645 nm and numeral 46Sd denotes a sagittal image surface of a beam having the minimum wavelength 625 nm, while numeral 46Mc denotes a meridional image surface of the beam having the central wavelength 635 nm, numeral 46Mu denotes a meridional image surface of the beam having the maximum wavelength 645 nm and numeral 46Md denotes a meridional image surface of the beam having the minimum wavelength 625 nm.

It is understood from the aberration diagram shown in FIG. 24 that the meridional image surface of each wavelength is relatively flatly corrected.

Figure 25:
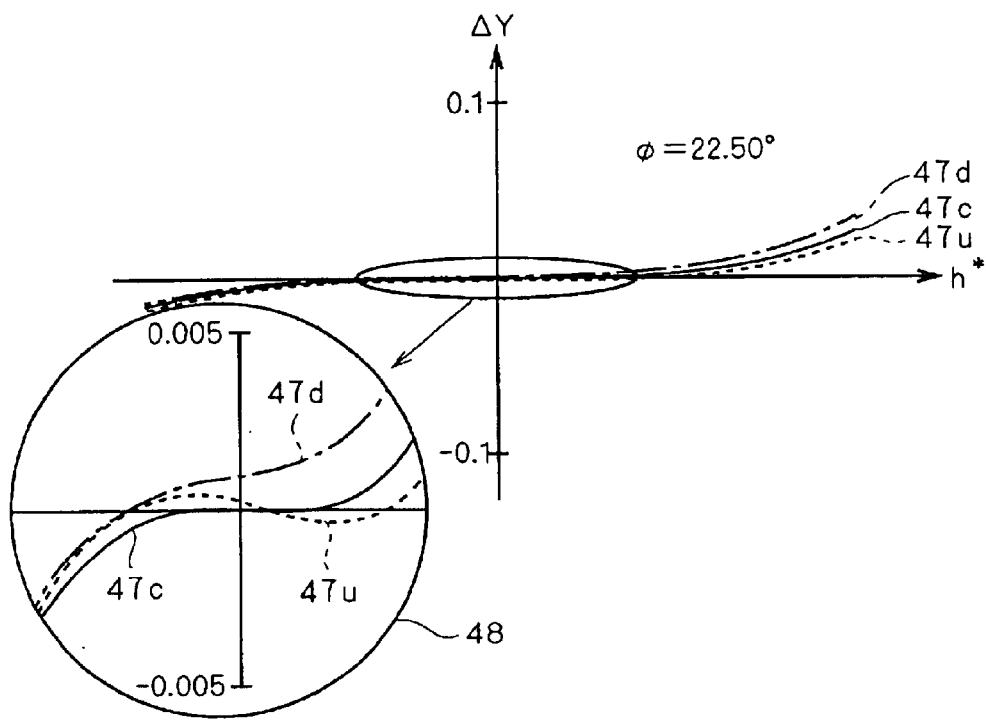
FIG. 25 is a lateral aberration diagram of the f-θ lens according to the example of the second preferred embodiment.
Figure 26:
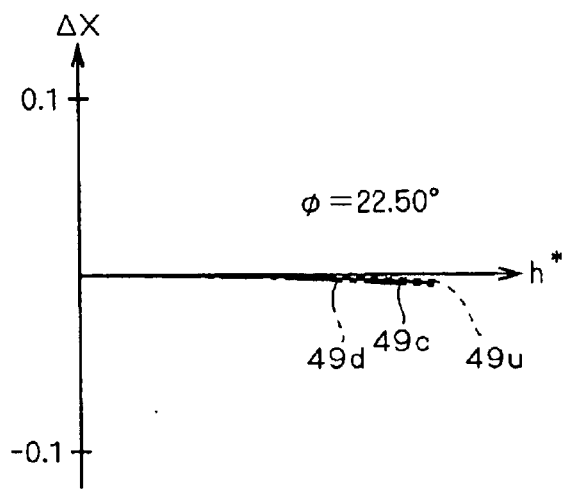
FIG. 26 is a lateral aberration diagram of the f-θ lens according to the example of the second preferred embodiment.
Figure 27:
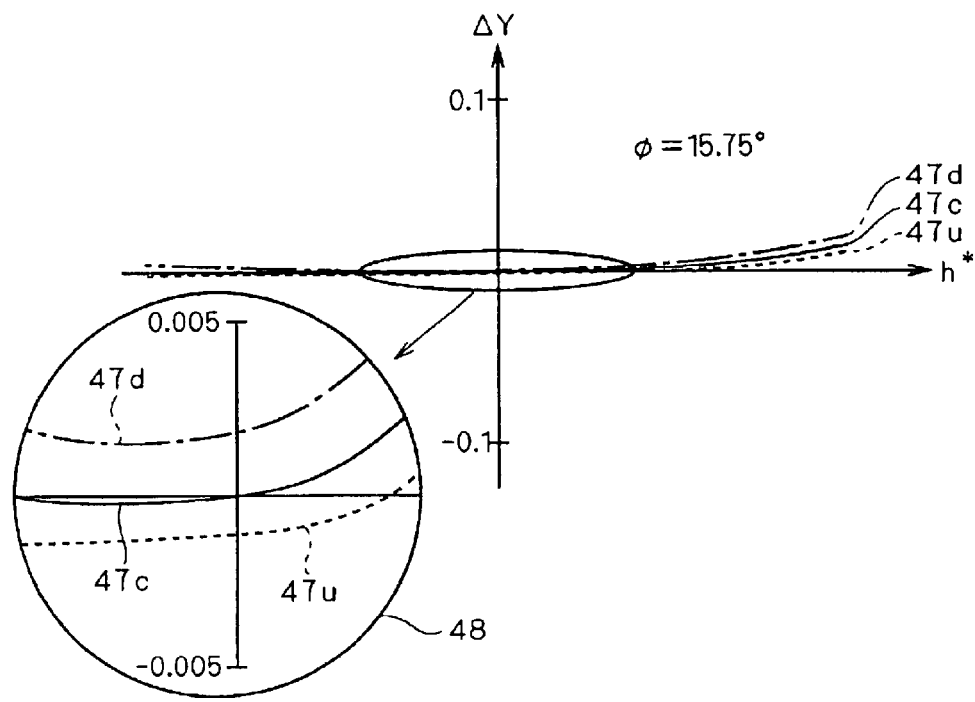
FIG. 27 is a lateral aberration diagram of the f-θ lens according to the example of the second preferred embodiment.
Figure 28:
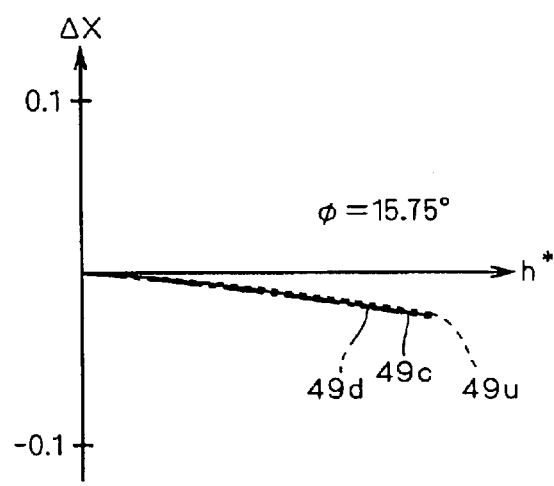
FIG. 28 is a lateral aberration diagram of the f-θ lens according to the example of the second preferred embodiment.
Figure 29:
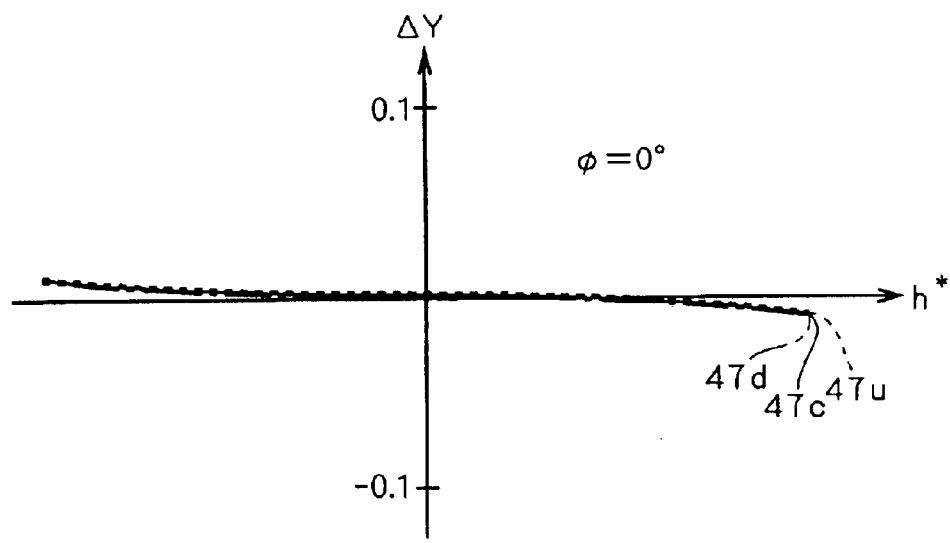
FIG. 29 is a lateral aberration diagram of the f-θ lens according to the example of the second preferred embodiment.

Each of FIGS. 25 to 30 is a lateral aberration diagram of the f-θ lens 6 related to the light beam having the working wave range of three wavelengths (635 nm, 625 nm and 645 nm). FIGS. 25, 27 and 29 show lateral aberration ΔY as to meridional beams for the aforementioned angles φ of 22.50°, 15.75° and 0° respectively. Referring to these figures, numerals 47c, 47u and 47d denote aberration curves of beams having the central, maximum and minimum wavelengths 635 nm, 645 nm and 625 nm respectively. Referring to each of FIGS. 25 and 27, numeral 48 denotes a partially enlarged view of the aberration curves 47c, 47u and 47d around the height h* of an entrance pupil reaching zero respectively.

Figure 30:
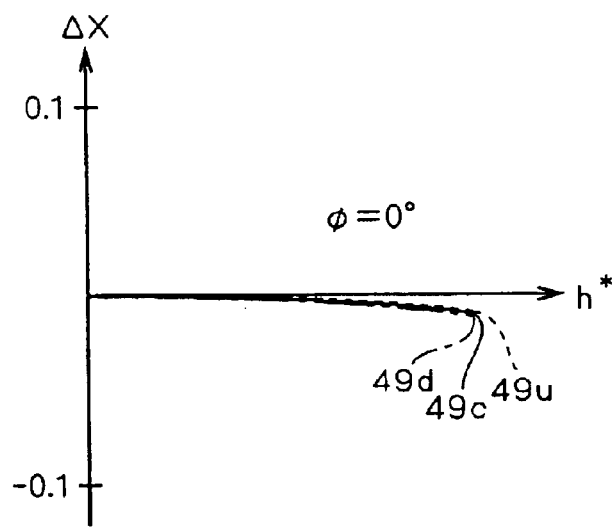
FIG. 30 is a lateral aberration diagram of the f-θ lens according to the example of the second preferred embodiment.

FIGS. 26, 28 and 30 show lateral aberration ΔX as to sagittal beams for the angles φ of 22.50°, 15.75° and 0° respectively. Referring to these figures, numerals 49c, 49u and 49d denote aberration curves of the beams having the central, maximum and minimum wavelengths 635 nm, 645 nm and 625 nm respectively.

It has been confirmed from the results of measurement of lateral aberration shown in FIGS. 25 to 30 that chromatic aberration of magnification in the working wave range of 625 nm to 645 nm is 0.0029 mm at the maximum and chromatic aberration of magnification has been properly corrected.

As to the f-θ characteristic of the f-θ lens 6 according to this example, an excellent numerical value of 0.27% was obtained. Table 11 shows measured values of each irradiated position $Y_n$, each distance $Y_{n+1} - Y_n$ and each ratio $D_n$.

Table 12 shows the maximum value $D_{max}$, the minimum value $D_{min}$ and the arithmetic mean $D_{ave}$ of the ratio $D_n$ and the values of the f-θ characteristic calculated through the measured values in Table 11.

TABLE 12

| | |
|---|---|
| $D_{max}$ | 1.00293 |
| $D_{min}$ | 1.00027 |
| $D_{ave}$ | 1.00167 |
| f-θ Characteristic | 0.27% |

Third Preferred Embodiment

An f-θ lens 6 according to a third preferred embodiment of the present invention is now described. This f-θ lens 6 is designed to be preferable as to a light beam having a working wave range of a central wavelength of 785 nm, a maximum wavelength of 800 nm and a minimum wavelength of 770 nm. In order to optimize optical performance with respect to this working wave range in particular, the f-θ lens 6 preferably satisfies the following conditional expressions (2C), (4C), (5C) and (6C):

$$0.15 \leq \frac{r1}{r4} \leq 0.22 \quad (2C)$$

$$0.61 \leq \frac{v1}{v2} \leq 0.64 \quad (4C)$$

$$0.57 \leq \frac{v4}{v3} \leq 0.64 \quad (5C)$$

$$0.30 \leq \frac{|f1|}{f} \leq 0.35 \quad (6C)$$

Figure 31:
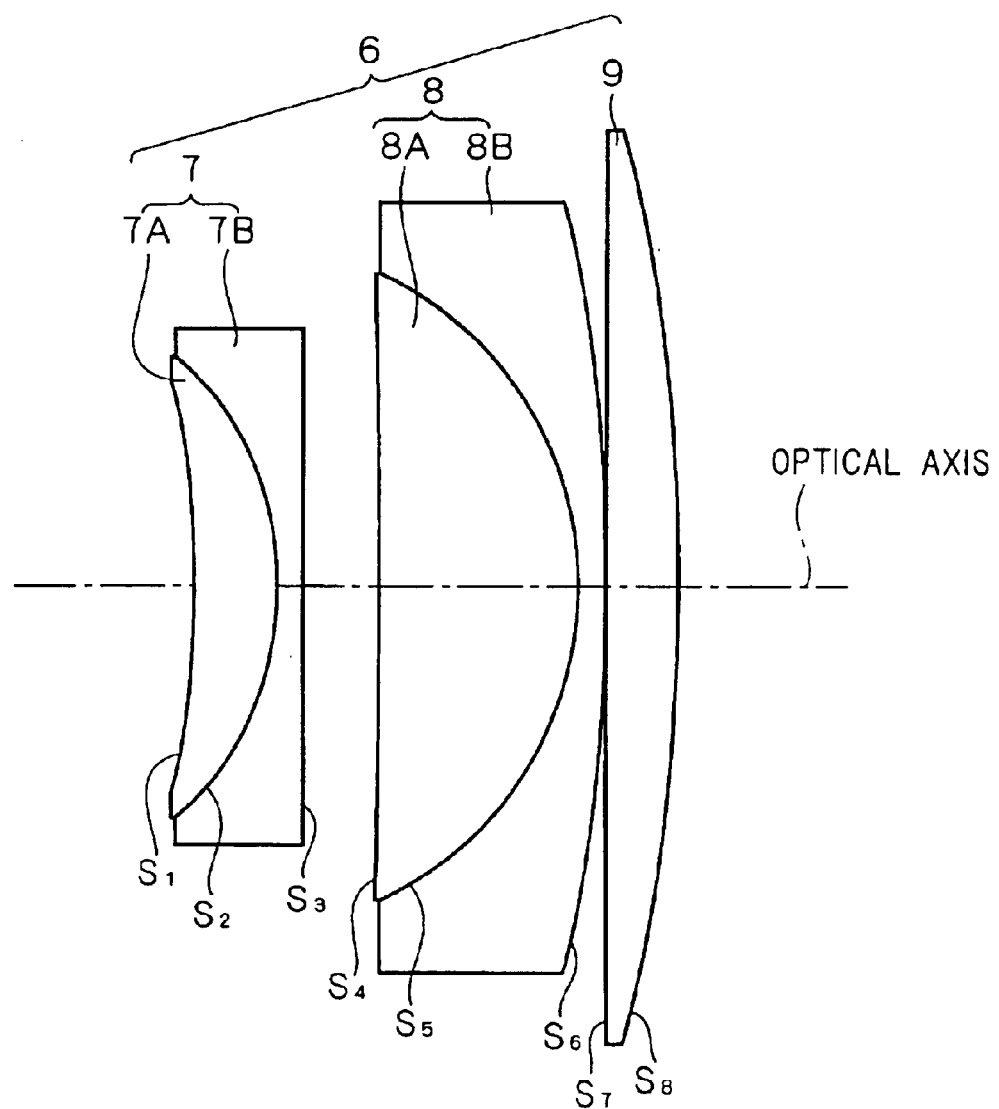
FIG. 31 is a schematic sectional view of an f-θ lens according to an example of a third preferred embodiment of the present invention.

An example of the f-θ lens 6 according to this embodiment is now described. FIG. 31 is a schematic sectional view of the f-θ lens 6 according to this example. Table 13 shows the focal distance f, the F-number and the total angle θ of view of the f-θ lens 6 according to this example and a working wave range of a laser beam oscillated in a light source 1.

TABLE 11

$D_n = (Y_{n+1} - Y_n)/(W/10)$

| N | 1 | 2 | 3 | 4 | 5 |
|---|---|---|---|---|---|
| $Y_{n+1}$ | 275.46005 | 220.35350 | 165.19240 | 110.07214 | 55.01526 |
| $Y_n$ | 220.35350 | 165.19240 | 110.07214 | 55.01526 | 0.00039 |
| $Y_{n+1} - Y_n$ | 55.10655 | 55.16110 | 55.12026 | 55.05688 | 55.01487 |
| $D_n$ | 1.00194 | 1.00293 | 1.00219 | 1.00103 | 1.00027 |

| N | 6 | 7 | 8 | 9 | 10 |
|---|---|---|---|---|---|
| $Y_{n+1}$ | 0.00039 | −55.01454 | −110.07160 | −165.19214 | −220.35347 |
| $Y_n$ | −55.01454 | −110.07160 | −165.19214 | −220.35347 | −275.46022 |
| $Y_{n+1} - Y_n$ | 55.01493 | 55.05706 | 55.12054 | 55.16134 | 55.10675 |
| $D_n$ | 1.00027 | 1.00104 | 1.00219 | 1.00293 | 1.00194 |

TABLE 13

| F-Number | F/29.17 |
|---|---|
| Focal Distance (f) | f = 700 mm |
| Total Angle of View (θ) | 45° |
| Central Wavelength ($\lambda_O$) | $\lambda_O$ = 785 nm |
| Upper Limit of Working Wave Range ($\lambda_{max}$) | $\lambda_{max}$ = 800 nm |
| Lower Limit of Working Wave Range ($\lambda_{min}$) | $\lambda_{min}$ = 770 nm |

Table 14 shows values indicating optical characteristics of the f-θ lens 6 according to this example.

TABLE 14

| I | r(i) | d(i) | $n_d$(i) | $v_d$(i) |
|---|---|---|---|---|
| 1 | −130.39786 | 11.183420 | 1.69895 | 30.1 |
| 2 | −40.73911 | 3.000000 | 1.69680 | 55.5 |
| 3 | 1897.68569 | 10.544729 | | |
| 4 | −838.95467 | 26.771852 | 1.69680 | 55.5 |
| 5 | −45.27285 | 3.000000 | 1.69895 | 30.1 |
| 6 | −215.77159 | 0.500000 | | |
| 7 | 10350.02614 | 10.000000 | 1.64850 | 53.0 |
| 8 | −197.92456 | | | |

Numerical values of various ratios used in the above conditional expressions (1), (2), (4), (5), (6) and (7) are as follows:

```
L/f = 0.093
r1/r4 = 0.155
v1/v2 = 0.633
N1 = 1.684118    N1u = 1.683409    N1L = 1.684866    v1 = 470
N2 = 1.688053    N2u = 1.687599    N2L = 1.688526    v2 = 742
v4/v3 = 0.633
N3 = 1.688053    N3u = 1.687599    N3L = 1.688526    v3 = 742
N4 = 1.684118    N4u = 1.683409    N4L = 1.684866    v4 = 470
|f1|/f = 0.250    f1 = −174.672735807
f3/f = 0.434      f3 = 303.485521422
``` where N1 represents the refractive index of a first lens 7A with respect to the central wavelength 785 nm, N1u represents the refractive index of the first lens 7A with respect to the maximum wavelength 800 nm, N1L represents the refractive index of the first lens 7A with respect to the minimum wavelength 770 nm, N2 represents the refractive index of a second lens 7B with respect to the central wavelength 785 nm, N2u represents the refractive index of the second lens 7B with respect to the maximum wavelength 800 nm, N2L represents the refractive index of the second lens 7B with respect to the minimum wavelength 770 nm, N3 represents the refractive index of a third lens 8A with respect to the central wavelength 785 nm, N3u represents the refractive index of the third lens 8A with respect to the maximum wavelength 800 nm, N3L represents the refractive index of the third lens 8A with respect to the minimum wavelength 770 nm, N4 represents the refractive index of a fourth lens 8B with respect to the central wavelength 785 nm, N4u represents the refractive index of the fourth lens 8B with respect to the maximum wavelength 800 nm and N4L represents the refractive index of the fourth lens 8B with respect to the minimum wavelength 770 nm.

It is understood that the numerical values of the aforementioned ratios L/f, r1/r4, v1/v2, v4/v3, |f1|/f and f3/f satisfy the conditional expressions (1), (2C), (4C), (5C), (6C) and (7) in this example.

Longitudinal chromatic aberration, astigmatism, chromatic aberration of magnification and an f-θ characteristic of the f-θ lens 6 having the aforementioned optical characteristics were measured by a method similar to that in the aforementioned first preferred embodiment.

Figure 32:
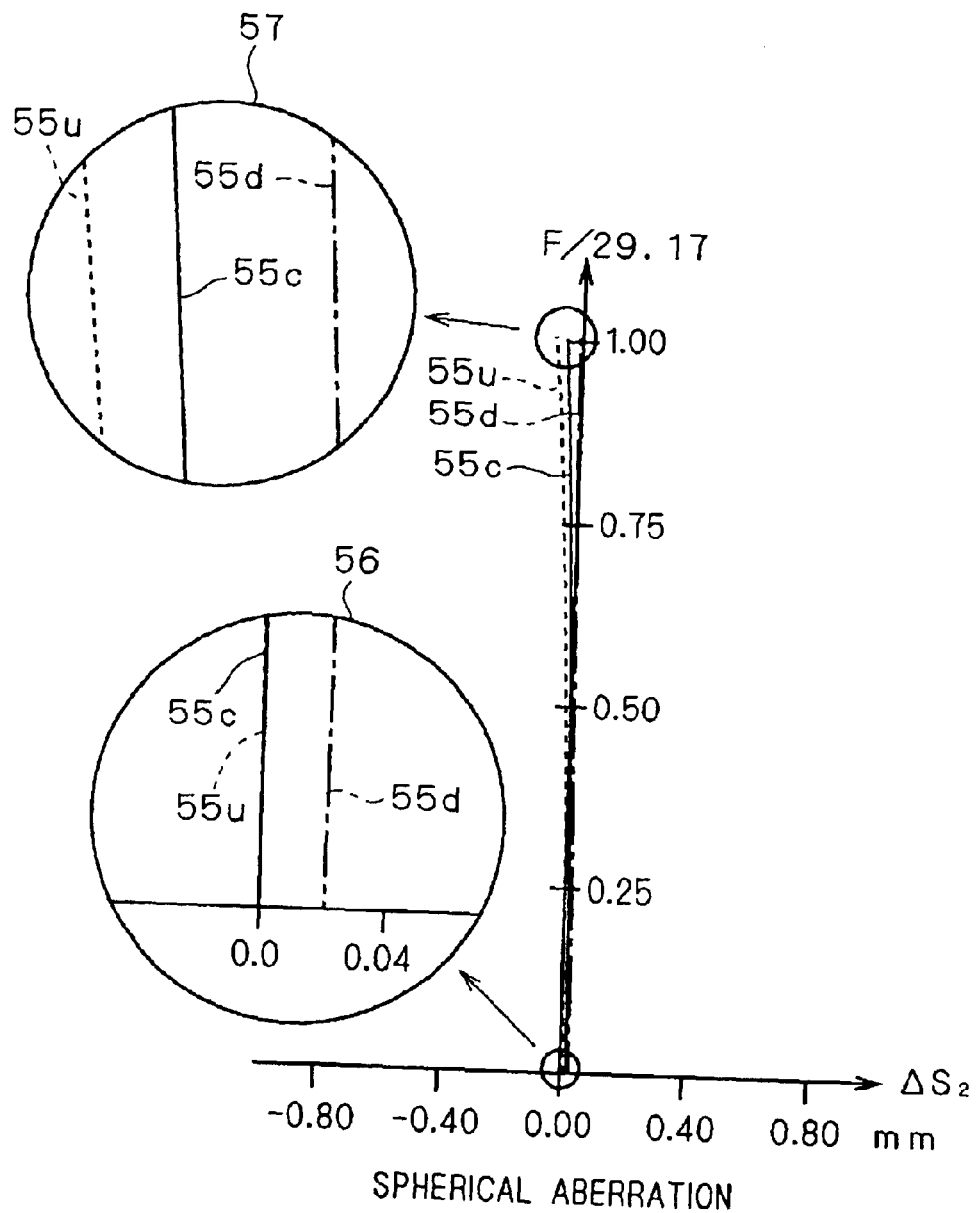
FIG. 32 is a spherical aberration diagram of the f-θ lens according to the example of the third preferred embodiment.

FIG. 32 is a spherical aberration diagram of the f-θ lens 6 related to a light beam having a working wave range of three wavelengths (785 nm, 770 nm and 800 nm). The aberration diagram shown in FIG. 32 plots aberration curves 55c, 55u and 55d with respect to the central, maximum and minimum wavelengths 785 nm, 800 nm and 770 nm respectively. Referring to FIG. 32, numeral 56 denotes a partially enlarged view showing the aberration curves 55c, 55u an 55d around pupil coordinates exhibiting the value zero and numeral 57 denotes a partially enlarged view showing the aberration curves 55c, 55u and 55d around pupil coordinates exhibiting the value "1". It has been recognized from the result of measurement of spherical aberration $\Delta S_2$ shown in FIG. 32 that longitudinal chromatic aberration between the maximum wavelength 800 nm and the minimum wavelength 770 nm is 0.0204 mm and the longitudinal chromatic aberration was properly corrected.

Figure 33:
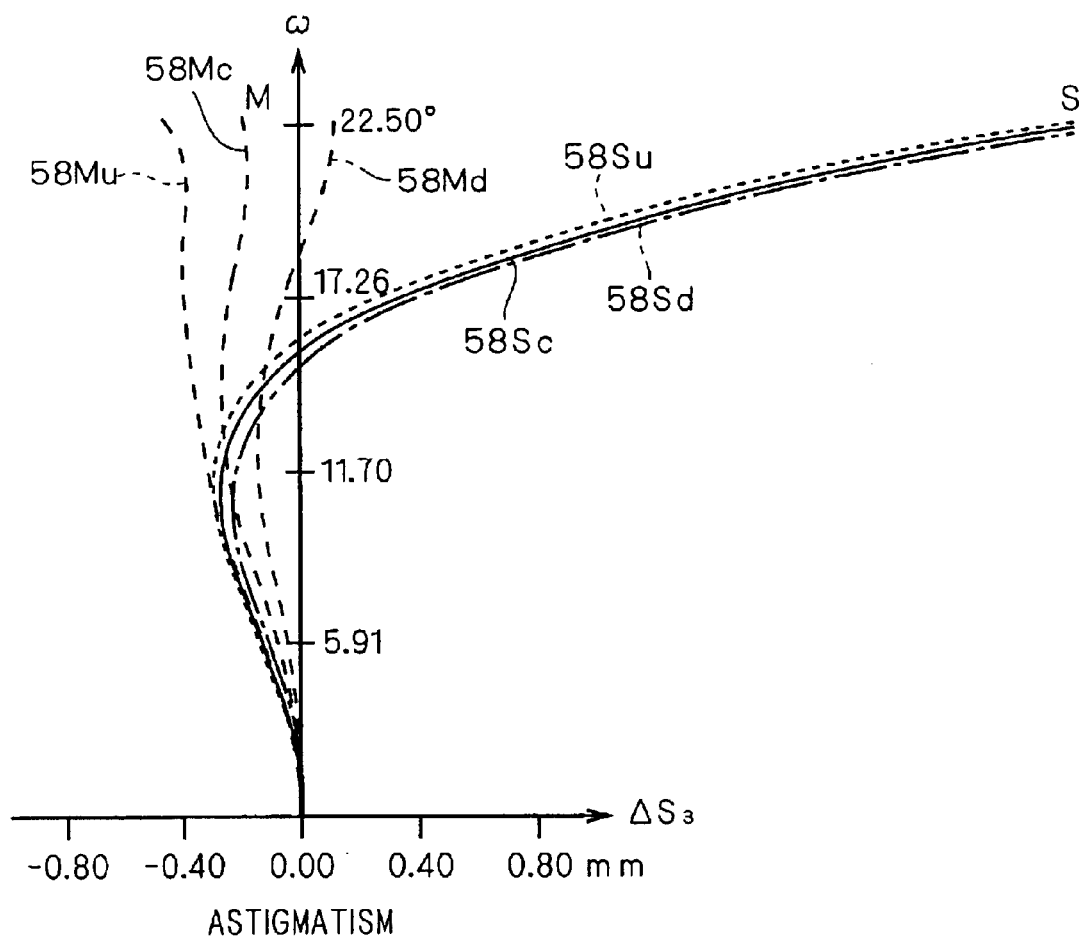
FIG. 33 is an astigmatism diagram of the f-θ lens according to the example of the third preferred embodiment.

FIG. 33 is an astigmatism diagram related to the light beam having the working wave range of three wavelengths (785 nm, 770 nm and 800 nm). Referring to FIG. 33, numeral 58Sc denotes a sagittal image surface of a beam having the central wavelength 785 nm, numeral 58Su denotes a sagittal image surface of a beam having the maximum wavelength 800 nm and numeral 58Sd denotes a sagittal image surface of a beam having the minimum wavelength 700 nm, while numeral 58Mc denotes a meridional image surface of the beam having the central wavelength 785 nm, numeral 58Mu denotes a meridional image surface of the beam having the maximum wavelength 800 nm and numeral 58Md denotes a meridional image surface of the beam having the minimum wavelength 770 nm.

It is understood from the aberration diagram shown in FIG. 33 that the meridional image surface of each wavelength is relatively flatly corrected.

Figure 34:
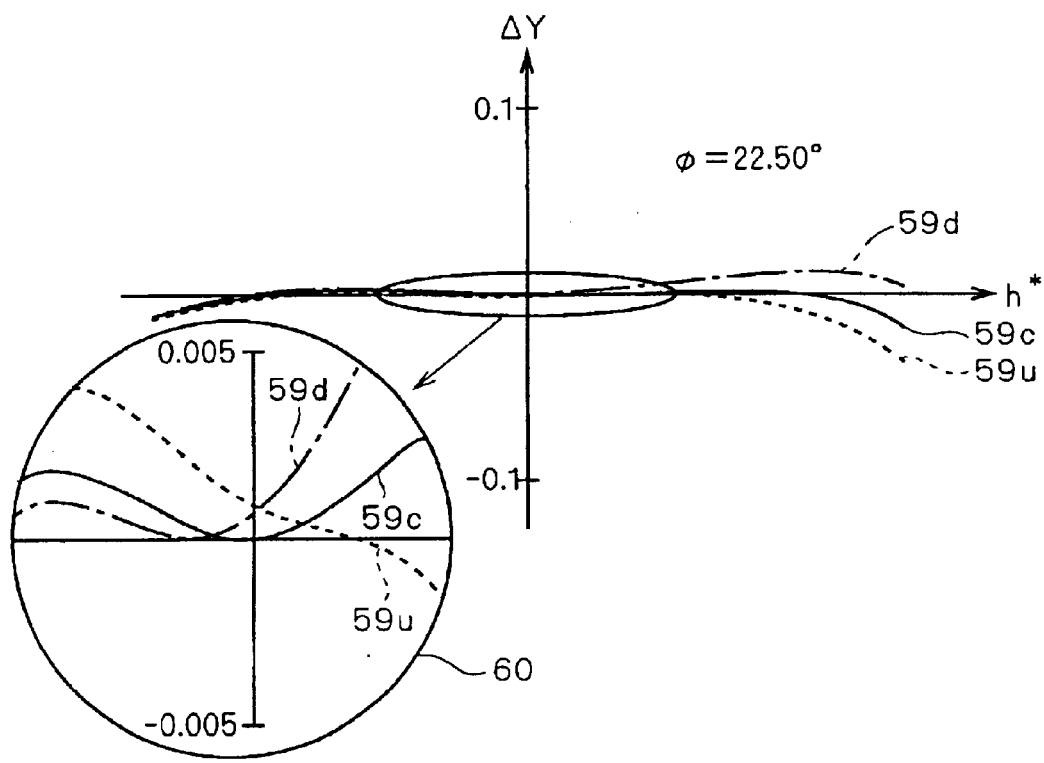
FIG. 34 is a lateral aberration diagram of the f-θ lens according to the example of the third preferred embodiment.
Figure 35:
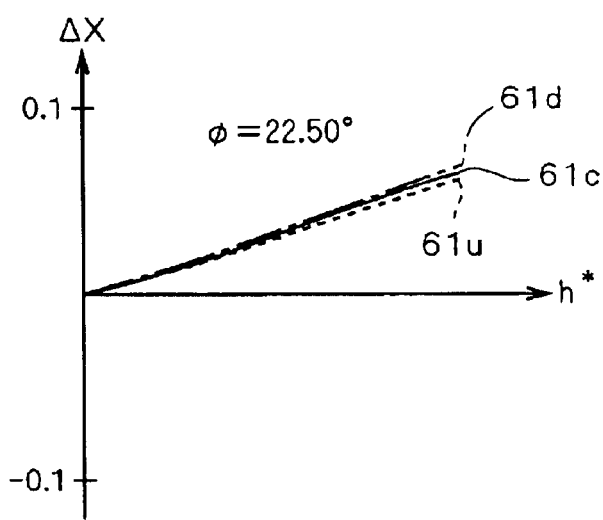
FIG. 35 is a lateral aberration diagram of the f-θ lens according to the example of the third preferred embodiment.
Figure 36:
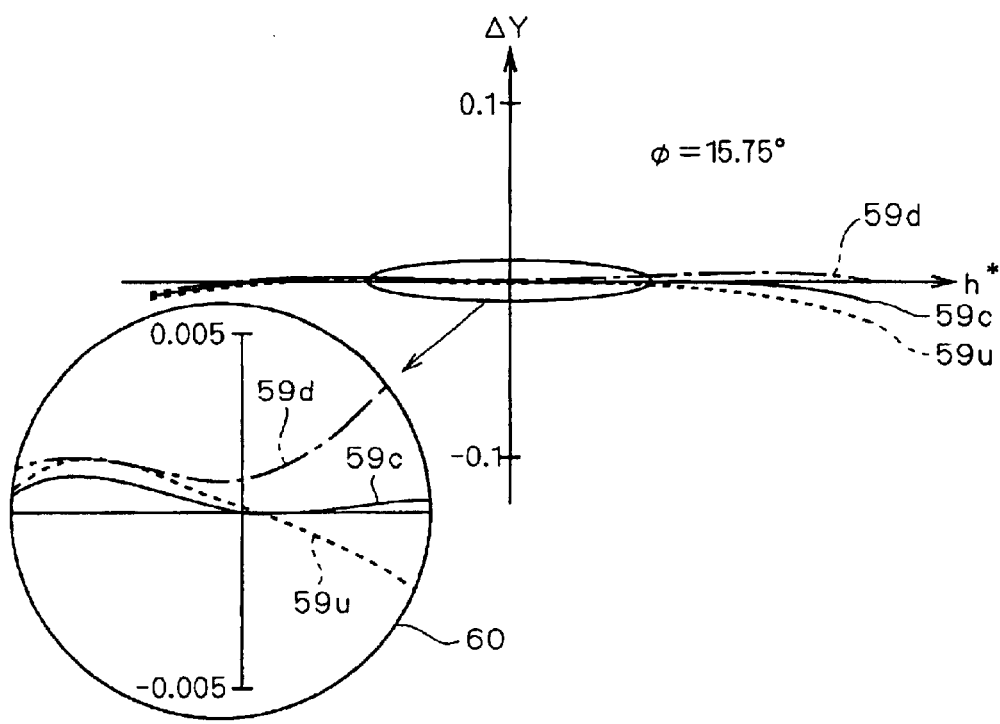
FIG. 36 is a lateral aberration diagram of the f-θ lens according to the example of the third preferred embodiment.
Figure 37:
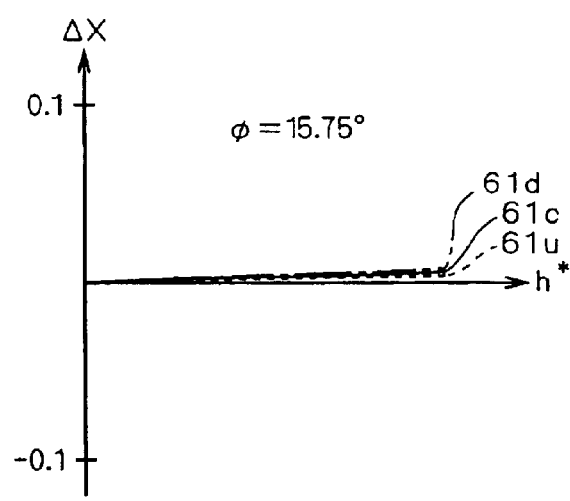
FIG. 37 is a lateral aberration diagram of the f-θ lens according to the example of the third preferred embodiment.
Figure 38:
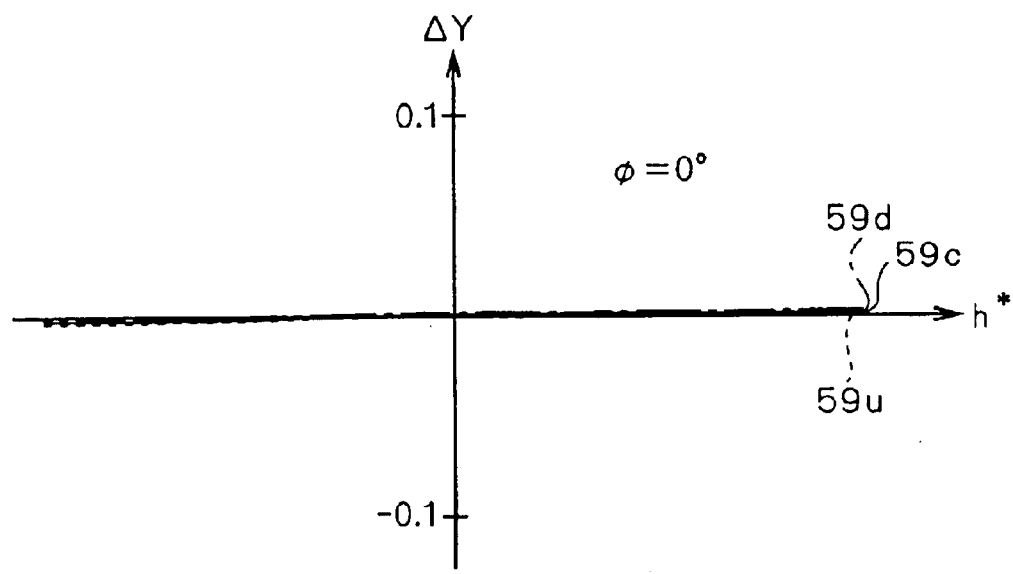
FIG. 38 is a lateral aberration diagram of the f-θ lens according to the example of the third preferred embodiment.

Each of FIGS. 34 to 39 is a lateral aberration diagram of the f-θ lens 6 related to the light beam having the working wave range of three wavelengths (785 nm, 770 nm and 800 nm). FIGS. 34, 36 and 38 show lateral aberration ΔY as to meridional beams for the aforementioned angles φ of 22.50°, 15.75° and 0° respectively. Referring to these figures, numerals 59c, 59u and 59d denote aberration curves of beams having the central, maximum and minimum wavelengths 785 nm, 800 nm and 770 nm respectively. Referring to each of FIGS. 34 and 36, numeral 60 denotes a partially enlarged view of the aberration curves 59c, 59u and 59d around the height h* of an entrance pupil reaching zero respectively.

Figure 39:
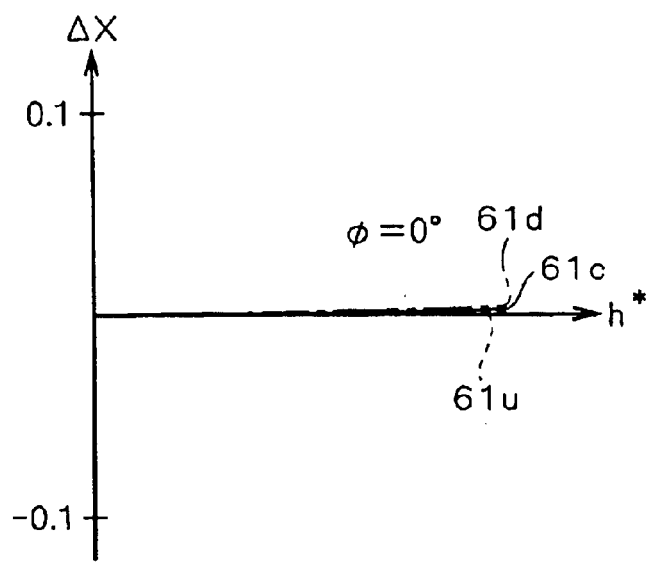
FIG. 39 is a lateral aberration diagram of the f-θ lens according to the example of the third preferred embodiment.
Figure 40:
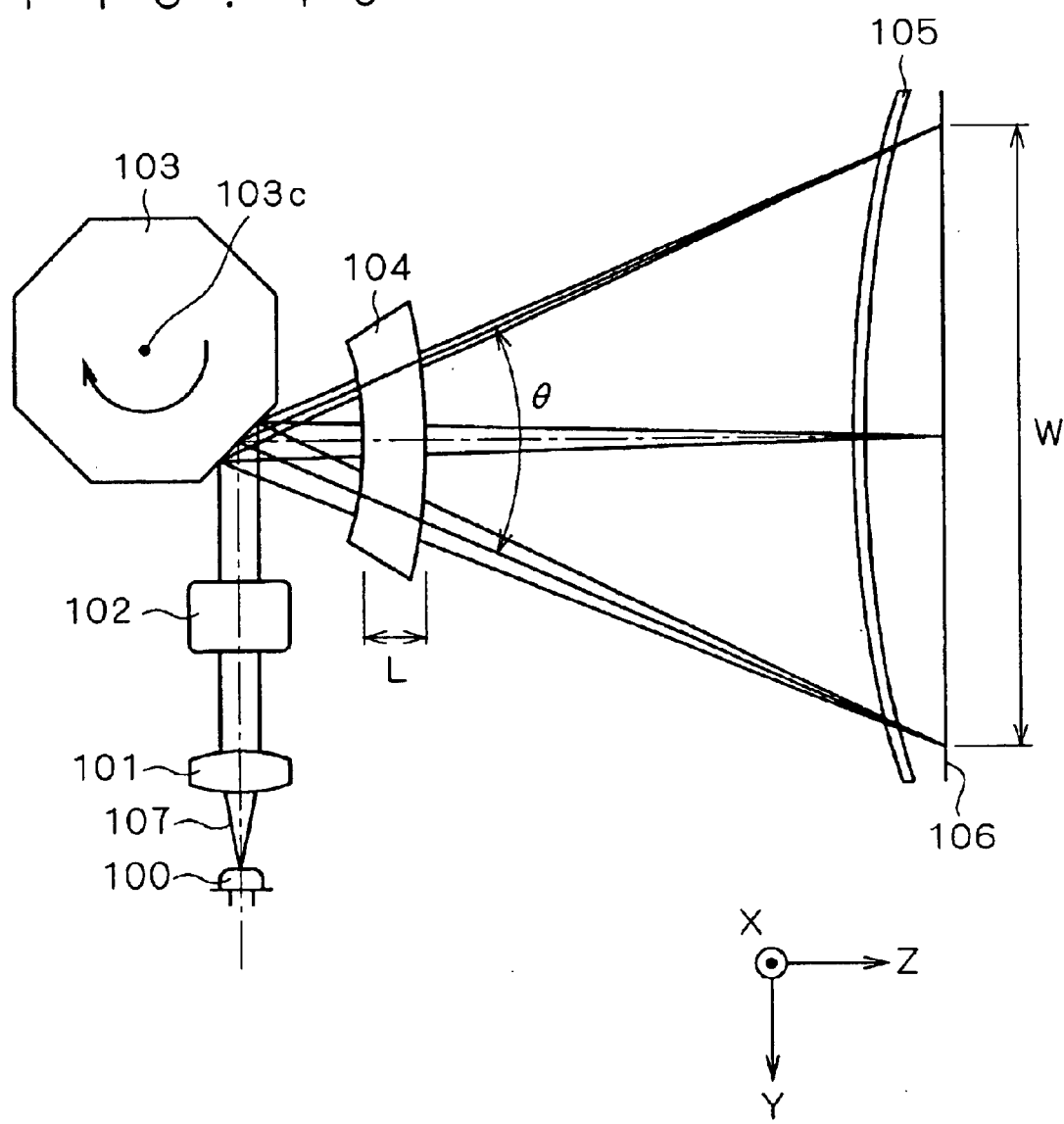
FIG. 40 is a diagram showing a conventional optical scanner developed along a Y-Z plane.
Figure 41:
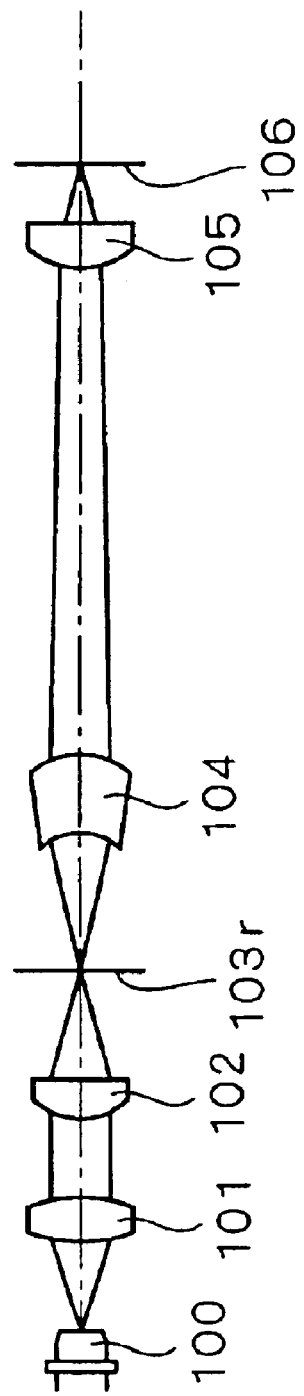
FIG. 41 is a longitudinal sectional view of the optical scanner shown in FIG. 40 developed along an optical axis.
Figure 42:
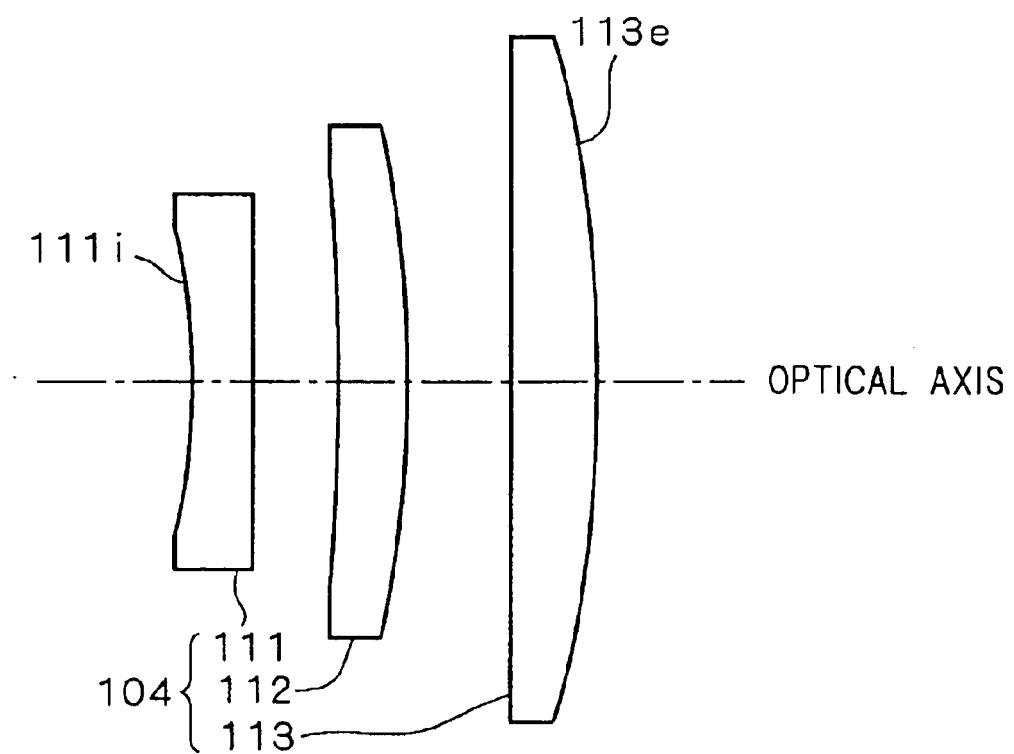
FIG. 42 is a schematic sectional view showing a conventional f-θ lens.

FIGS. 35, 37 and 39 show lateral aberration ΔX as to sagittal beams for the angles φ of 22.50°, 15.75° and 0° respectively. Referring to these figures, numerals 61c, 61u and 61d denote aberration curves of the beams having the central, maximum and minimum wavelengths 785 nm, 800 nm and 770 nm respectively.

It has been confirmed from the results of measurement of lateral aberration shown in FIGS. 34 to 39 that chromatic aberration of magnification in the working wave range of 770 nm to 800 nm is 0.0014 mm at the maximum and chromatic aberration of magnification has been properly corrected.

As to the f-θ characteristic of the f-θ lens 6 according to this example, an excellent numerical value of 0.29% was obtained. Table 15 shows measured values of each irradiated position $Y_n$, each distance $Y_{n+1} - Y_n$ and each ratio $D_n$.

TABLE 15

| | $D_n = (Y_{n+1} - Y_n)/(W/10)$ | | | | |
|---|---|---|---|---|---|
| N | 1 | 2 | 3 | 4 | 5 |
| $Y_{n+1}$ | 275.36305 | 220.26162 | 165.11557 | 110.01747 | 54.98681 |
| $Y_n$ | 220.26162 | 165.11557 | 110.01747 | 54.98681 | −0.00002 |
| $Y_{n+1} - Y_n$ | 55.10143 | 55.14605 | 55.09810 | 55.03066 | 54.98682 |
| $D_n$ | 1.00184 | 1.00266 | 1.00178 | 1.00056 | 0.99976 |
| N | 6 | 7 | 8 | 9 | 10 |
| $Y_{n+1}$ | −0.00002 | −54.98677 | −110.01732 | −165.11545 | −220.26162 |
| $Y_n$ | −54.98677 | −110.01732 | −165.11545 | −220.26162 | −275.36300 |
| $Y_{n+1} - Y_n$ | 54.98676 | −55.03055 | −55.09813 | 55.14617 | 55.10138 |
| $D_n$ | 0.99976 | 1.00056 | 1.00178 | 1.00266 | 1.00184 |

Table 16 shows the maximum value $D_{max}$, the minimum value $D_{min}$ and the arithmetic mean $D_{ave}$ of the ratio $D_n$ and the values of the f-θ characteristic calculated through the measured values in Table 15.

TABLE 16

| $D_{max}$ | 1.00266 |
|---|---|
| $D_{min}$ | 0.99976 |
| $D_{ave}$ | 1.00132 |
| f-θ Characteristic | 0.29% |

While the invention has been shown and described in detail, the foregoing description is in all aspects illustrative and not restrictive. It is therefore understood that numerous modifications and variations can be devised without departing from the scope of the invention.

What is claimed is:

1. An optical scanner comprising:
   a light deflector periodically reflecting a light beam emitted from a light source to periodically deflect said light beam; and
   an imaging optical system having such a distortion characteristic that the product of a focal distance and a half angle of view defines an ideal image height for imaging said light beam deflected by said light deflector on an objective surface, wherein
   said imaging optical system comprises:
   a first cemented lens, formed by bonding a first lens and a second lens to each other, having negative refracting power;
   a second cemented lens, formed by bonding a third lens and a fourth lens to each other, having positive refracting power; and
   a fifth lens having positive refracting power successively from an entrance side for said light beam to satisfy the following expressions (1) and (2):

$$\frac{L}{f} < 0.100 \tag{1}$$

$$0.04 \leq \frac{r1}{r4} \leq 0.31 \tag{2}$$

where
   L represents the length between a plane of incidence of said first cemented lens and a plane of exit of said fifth lens along an optical axis direction,
   f represents the composite focal distance of said first cemented lens, said second cemented lens and said fifth lens in the above expression (1),
   r1 represents the radius of curvature of a refracting interface on the entrance side for said light beam in said first lens,
   r4 represents the radius of curvature of a refracting interface on the entrance side for said light beam in said third lens in the above expression (2).

2. The optical scanner according to claim 1, wherein said first lens and said second lens are essentially made of an optical material satisfying the following expression (4) on the basis of a partial Abbe's number v defined in the following expression (3):

$$v = \frac{N-1}{N_{MIN} - N_{MAX}} \tag{3}$$

$$0.48 \leq \frac{v1}{v2} \leq 0.64 \tag{4}$$

where
   N represents a refractive index with respect to the central wavelength of a working wave range of said light beam,
   $N_{MIN}$ represents a refractive index with respect to the lower limit of the working wave range of said light beam,
   $N_{MAX}$ represents a refractive index with respect to the upper limit of the working wave range of said light beam in the above expression (3),
   v1 represents the partial Abbe's number of said first lens,
   v2 represents the partial Abbe's number of said second lens in the above expression (4).

3. The optical scanner according to claim 2, wherein said third lens and said fourth lens are essentially made of an optical material satisfying the following expression (5) on the basis of the partial Abbe's number v defined in the following expression (3):

$$v = \frac{N-1}{N_{MIN} - N_{MAX}} \tag{3}$$

$$0.42 \leq \frac{v4}{v3} \leq 0.64 \tag{5}$$

where
   N represents the refractive index with respect to the central wavelength of the working wave range of said light beam,
   $N_{MIN}$ represents the refractive index with respect to the lower limit of the working wave range of said light beam, $N_{MAX}$ represents the refractive index with respect to the upper limit of the working wave range of said light beam in the above expression (3), v3 represents the partial Abbe's number of said third lens, v4 represents the partial Abbe's number of said fourth lens in the above expression (5).

4. The optical scanner according to claim 3, wherein said imaging optical system satisfies the following expression (6):

$$0.24 \leq \frac{|f1|}{f} \leq 0.35 \quad (6)$$

where f1 represents the focal distance of said first cemented lens in the above expression (6).

5. The optical scanner according to claim 4, wherein said imaging optical system satisfies the following expression (7):

$$0.43 \leq \frac{f3}{f} \leq 0.67 \quad (7)$$

where f3 represents the focal distance of said fifth lens in the above expression (7).

6. The optical scanner according to claim 5, wherein another imaging optical system converging said light beam emitted from said light source only in the direction of the rotational axis of said light deflector and imaging said light beam on a reflecting surface of said light deflector is further provided on an optical path between said light source and said light deflector, and said imaging optical system further comprises an anamorphic lens converging a light beam outgoing from said fifth lens in the direction of the rotational axis of said light deflector and imaging said light beam on said objective surface.

7. The optical scanner according to claim 6, wherein said light beam has a central wavelength of around 405 nm, and said imaging optical system satisfies the following expression (2A):

$$0.04 \leq \frac{r1}{r4} \leq 0.17. \quad (2A)$$

8. The optical scanner according to claim 7, wherein said optical material satisfies the following expression (4A) with respect to said light beam having said central wavelength of around 405 nm:

$$0.48 \leq \frac{v1}{v2} \leq 0.58. \quad (4A)$$

9. The optical scanner according to claim 8, wherein said optical material satisfies the following expression (5A) with respect to said light beam having said central wavelength of around 405 nm:

$$0.42 \leq \frac{v4}{v3} \leq 0.47. \quad (5A)$$

10. The optical scanner according to claim 9, wherein said imaging optical system satisfies the following expression (6A) with respect to said light beam having said central wavelength of around 405 nm:

$$0.24 \leq \frac{|f1|}{f} \leq 0.32. \quad (6A)$$

11. The optical scanner according to claim 6, wherein said light beam has a central wavelength of around 635 nm, and said imaging optical system satisfies the following expression (2B):

$$0.13 \leq \frac{r1}{r4} \leq 0.31. \quad (2B)$$

12. The optical scanner according to claim 11, wherein said optical material satisfies the following expression (4B) with respect to said light beam having said central wavelength of around 635 nm:

$$0.59 \leq \frac{v1}{v2} \leq 0.64. \quad (4B)$$

13. The optical scanner according to claim 12, wherein said optical material satisfies the following expression (5B) with respect to said light beam having said central wavelength of around 635 nm:

$$0.48 \leq \frac{v4}{v3} \leq 0.64. \quad (5B)$$

14. The optical scanner according to claim 13, wherein said imaging optical system satisfies the following expression (6B) with respect to said light beam having said central wavelength of around 635 nm:

$$0.28 \leq \frac{|f1|}{f} \leq 0.33. \quad (6B)$$

15. The optical scanner according to claim 6, wherein said light beam has a central wavelength of around 785 nm, and said imaging optical system satisfies the following expression (2C):

$$0.15 \leq \frac{r1}{r4} \leq 0.22. \quad (2C)$$

16. The optical scanner according to claim 15, wherein said optical material satisfies the following expression (4C) with respect to said light beam having said central wavelength of around 785 nm:

$$0.61 \leq \frac{v1}{v2} \leq 0.64. \quad (4C)$$

17. The optical scanner according to claim 16, wherein said optical material satisfies the following expression (5C) with respect to said light beam having said central wavelength of around 785 nm:

$$0.57 \leq \frac{v4}{v3} \leq 0.64. \quad (5C)$$

18. The optical scanner according to claim 17, wherein said imaging optical system satisfies the following expression (6C) with respect to said light beam having said central wavelength of around 785 nm:

$$0.30 \leq \frac{|f1|}{f} \leq 0.35. \quad (6C)$$

* * * * *